US012802673B2

(12) United States Patent
Rode

(10) Patent No.: US 12,802,673 B2
(45) Date of Patent: Nov. 17, 2026

(54) SYSTEMS AND METHODS FOR FACILITATING CUSTOMIZING A PRODUCTION OF MUSICAL SOUNDS ASSOCIATED WITH A MUSICAL INSTRUMENT

(71) Applicant: Tejas Pradip Rode, Chandler, AZ (US)

(72) Inventor: Tejas Pradip Rode, Chandler, AZ (US)

( * ) Notice: Subject to any disclaimer, the term of this patent is extended or adjusted under 35 U.S.C. 154(b) by 266 days.

(21) Appl. No.: 18/885,563

(22) Filed: Sep. 14, 2024

(65) Prior Publication Data

US 2026/0080853 A1 Mar. 19, 2026

(51) Int. Cl.
*G10H 7/00* (2006.01)

(52) U.S. Cl.
CPC ......... *G10H 7/00* (2013.01); *G10H 2210/101* (2013.01); *G10H 2220/106* (2013.01); *G10H 2220/116* (2013.01); *G10H 2220/131* (2013.01)

(58) Field of Classification Search
CPC ....... G10H 2210/325; G10H 2210/331; G10H 2220/116; G10H 2220/126; G10H 2220/101
See application file for complete search history.

(56) References Cited

U.S. PATENT DOCUMENTS 5,496,963 A * 3/1996 Ito .......................... G10H 1/186 84/478
6,388,183 B1 * 5/2002 Leh ...................... G10H 1/0008 84/645
7,268,286 B2 * 9/2007 Carpenter ................ G10G 7/02 84/454
7,732,701 B2 * 6/2010 Miki ........................ G10H 1/24 84/615
7,750,224 B1 * 7/2010 Rav-Niv ................ G09B 15/00 84/485 R (Continued)

OTHER PUBLICATIONS

Larsen, "How to Use Flex Pitch in Logic Pro X | Tutorial", https://www.youtube.com/watch?v=uGScoEhjKus, Apr. 8, 2017 (Year: 2017).*

(Continued)

*Primary Examiner* — Patrick F Riegler
(74) *Attorney, Agent, or Firm* — Dhiraj Jindal; PATENT YOGI LLC

(57) ABSTRACT

The present disclosure provides a method for facilitating customizing a production of musical sounds associated with a musical instrument. Further, the method may include transmitting a graphical interface to a device, receiving a keyboard key selection of a keyboard key region from keyboard key regions from the device, identifying a region from regions comprised in each of characteristic associating elements, displaying a region selection indication for the region in each of the characteristic associating elements, receiving a zone selection of a zone from the two or more zones of the region using the graphical interface from the device, assigning each of musical sound characteristics uniquely to one or more of keyboard keys, generating a musical sound information for one or more of the keyboard keys based on the assigning, and storing the region-keyboard key relationship, the zone-characteristic relationship, and the musical sound information.

20 Claims, 16 Drawing Sheets

(56) References Cited

U.S. PATENT DOCUMENTS

| | | | | |
|---|---|---|---|---|
| 7,915,514 | B1 * | 3/2011 | Shrem | G10H 1/0075 84/645 |
| 9,583,084 | B1 * | 2/2017 | Fagan | G10H 1/38 |
| 10,262,643 | B1 * | 4/2019 | Kinter | G10H 5/06 |
| 10,642,409 | B2 * | 5/2020 | Obata | G10H 1/34 |
| 11,935,509 | B1 * | 3/2024 | Netherland | G10H 1/0066 |
| 2002/0005108 | A1 * | 1/2002 | Ludwig | G10H 1/0058 84/600 |
| 2002/0108484 | A1 * | 8/2002 | Arnold | G10G 7/00 84/615 |
| 2005/0120870 | A1 * | 6/2005 | Ludwig | G10H 1/00 84/661 |
| 2007/0084330 | A1 * | 4/2007 | Okuyama | G10G 7/02 84/454 |
| 2008/0184872 | A1 * | 8/2008 | Hunt | G10H 1/02 84/645 |
| 2009/0025541 | A1 * | 1/2009 | Miki | G10H 1/44 84/615 |
| 2011/0100198 | A1 * | 5/2011 | Gatzsche | G10H 1/0008 84/615 |
| 2012/0090447 | A1 * | 4/2012 | Hinokio | G10H 1/0008 84/601 |
| 2013/0305906 | A1 * | 11/2013 | Kinter | G10H 1/386 84/613 |
| 2014/0033897 | A1 * | 2/2014 | Bludov | G10H 1/344 84/423 R |
| 2015/0268926 | A1 * | 9/2015 | Panaiotis | G06F 3/017 715/716 |
| 2016/0240180 | A1 * | 8/2016 | McPherson | G10H 1/02 |
| 2018/0268792 | A1 * | 9/2018 | Serletic | G10H 1/0025 |
| 2018/0275816 | A1 * | 9/2018 | Obata | G06F 3/0488 |
| 2019/0103082 | A1 * | 4/2019 | Ogasawara | G10H 7/008 |
| 2019/0378482 | A1 * | 12/2019 | Vorobyev | G10H 1/0066 |
| 2020/0258485 | A1 * | 8/2020 | Ota | G10H 1/0041 |
| 2021/0056941 | A1 * | 2/2021 | Chang | G10H 1/0066 |
| 2021/0151019 | A1 * | 5/2021 | Hasebe | G10H 1/26 |
| 2023/0053899 | A1 * | 2/2023 | Minakata | G10H 1/38 |
| 2023/0298547 | A1 * | 9/2023 | Kishi | G06Q 50/10 84/602 |
| 2025/0191558 | A1 * | 6/2025 | Silverstein | G06Q 50/184 |
| 2025/0329316 | A1 * | 10/2025 | Oh | G10H 1/0008 |
| 2026/0080853 | A1 * | 3/2026 | Rode | G10H 7/00 |
| 2026/0112344 | A1 * | 4/2026 | Narita | G10H 1/0008 |

OTHER PUBLICATIONS

Erose, "How to Microtune Easily", https://www.youtube.com/watch?v=MrNcMnfh5yM, May 28, 2024 (Year: 2024).*

* cited by examiner

SYSTEMS AND METHODS FOR FACILITATING CUSTOMIZING A PRODUCTION OF MUSICAL SOUNDS ASSOCIATED WITH A MUSICAL INSTRUMENT

FIELD OF DISCLOSURE

Generally, the present disclosure relates to the field of data processing. More specifically, the present disclosure relates to methods and systems for facilitating customizing a production of musical sounds associated with a musical instrument.

BACKGROUND

The field of data processing is technologically important to several industries, business organizations, and/or individuals.

Existing techniques for facilitating customizing a production of musical sounds associated with a musical instrument are deficient with regard to several aspects. For instance, current technologies for controlling musical instruments typically manage each parameter in isolation, resulting in a fragmented user experience. This disjointed handling of parameters impedes the user's ability to comprehend the interrelationships between various parameters. Furthermore, this separation of parameter controls necessitates a prolonged learning curve and increased time investment for users to become proficient with the interface. Furthermore, current technologies do not provide a cohesive framework that allows users to intuitively understand and manipulate the interactions between multiple parameters, thereby affecting overall efficiency and usability.

Therefore, there is a need for improved methods and systems for facilitating customizing a production of musical sounds associated with a musical instrument that may overcome one or more of the above-mentioned problems and/or limitations.

SUMMARY OF DISCLOSURE

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

The present disclosure provides a method for facilitating customizing a production of musical sounds associated with a musical instrument. Further, the method may include transmitting, using a communication device, a graphical interface to one or more devices. Further, the method may include receiving, using the communication device, a keyboard key selection of a keyboard key region from the two or more keyboard key regions using the graphical interface from the one or more devices. Further, the method may include identifying, using a processing device, a region from the two or more regions comprised in each of the one or more characteristic associating elements based on the keyboard key selection and the region-keyboard key relationship. Further, the method may include displaying, using the processing device, a region selection indication for the region in each of the one or more characteristic associating elements based on the identifying of the region. Further, the method may include receiving, using the communication device, a zone selection of a zone from the two or more zones of the region using the graphical interface from the one or more devices. Further, the method may include assigning, using the processing device, each of the two or more musical sound characteristics uniquely to one or more of the two or more keyboard keys based on the zone selection and the zone-characteristic relationship. Further, the method may include generating, using the processing device, a musical sound information for one or more of the two or more keyboard keys based on the assigning. Further, the method may include storing, using a storage device, the region-keyboard key relationship, the zone-characteristic relationship, and the musical sound information.

The present disclosure provides a system for facilitating customizing a production of musical sounds associated with a musical instrument. Further, the system may include a communication device. Further, the communication device may be configured for transmitting a graphical interface to one or more devices. Further, the graphical interface includes two or more graphical interface elements. Further, the communication device may be configured for receiving a keyboard key selection of a keyboard key region from the two or more keyboard key regions using the graphical interface from the one or more devices. Further, the communication device may be configured for receiving a zone selection of a zone from the two or more zones of the region using the graphical interface from the one or more devices. Further, the system may include a processing device communicatively coupled with the communication device. Further, the processing device may be configured for identifying a region from the two or more regions comprised in each of the one or more characteristic associating elements based on the keyboard key selection and the region-keyboard key relationship. Further, the processing device may be configured for displaying a region selection indication for the region in each of the one or more characteristic associating elements based on the identifying of the region. Further, the processing device may be configured for assigning each of the two or more musical sound characteristics uniquely to one or more of the two or more keyboard keys based on the zone selection and the zone-characteristic relationship. Further, the processing device may be configured for generating a musical sound information for one or more of the two or more keyboard keys based on the assigning. Further, the system may include a storage device communicatively coupled with the processing device. Further, the storage device may be configured for storing the region-keyboard key relationship, the zone-characteristic relationship, and the musical sound information.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTIONS OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

Figure 8:
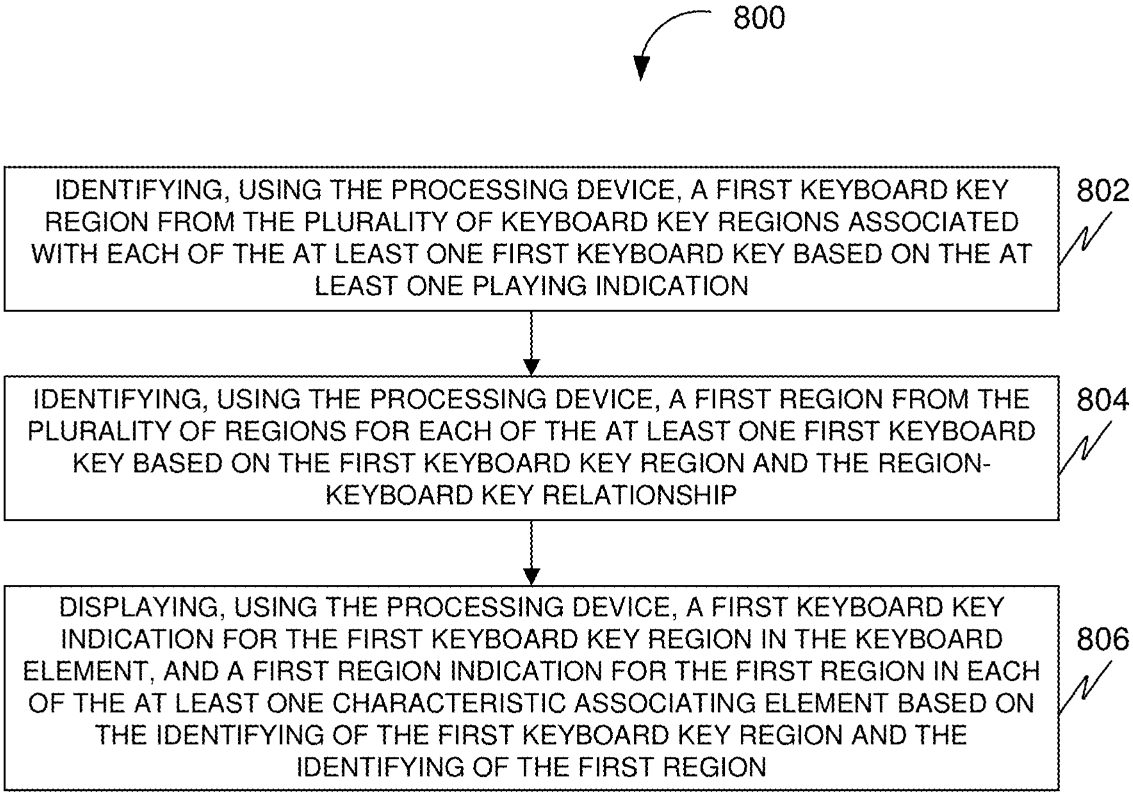

FIG. 8 illustrates a flowchart of a method 800 for facilitating customizing a production of musical sounds associated with a musical instrument including displaying, using the processing device, a first keyboard key indication for the first keyboard key region in the keyboard element, and a first region indication for the first region in each of the at least one characteristic associating element, in accordance with some embodiments.

Figure 9:
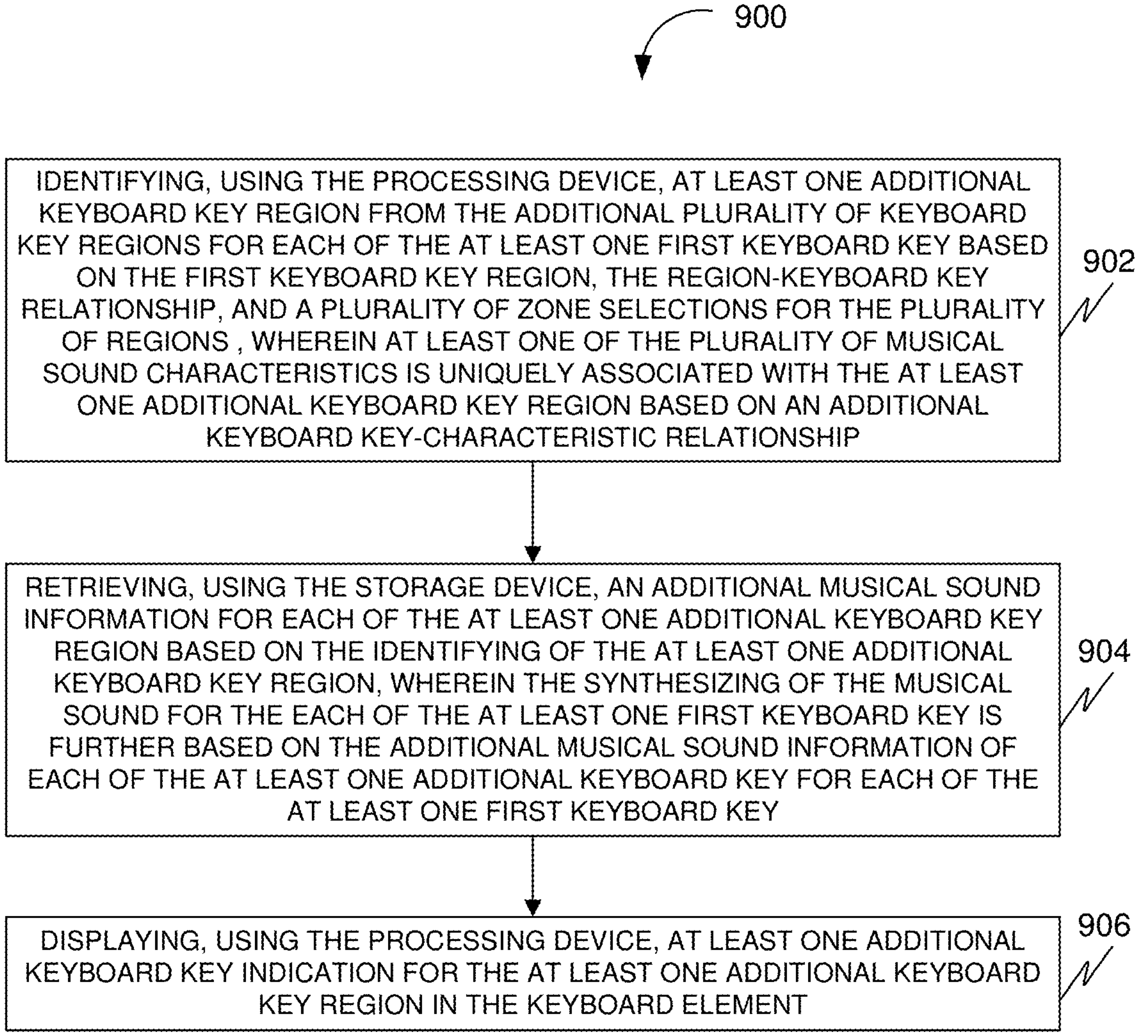

FIG. 9 illustrates a flowchart of a method 900 for facilitating customizing a production of musical sounds associated with a musical instrument including displaying, using the processing device, at least one additional keyboard key indication for the at least one additional keyboard key region in the keyboard element, in accordance with some embodiments.

Figure 10:
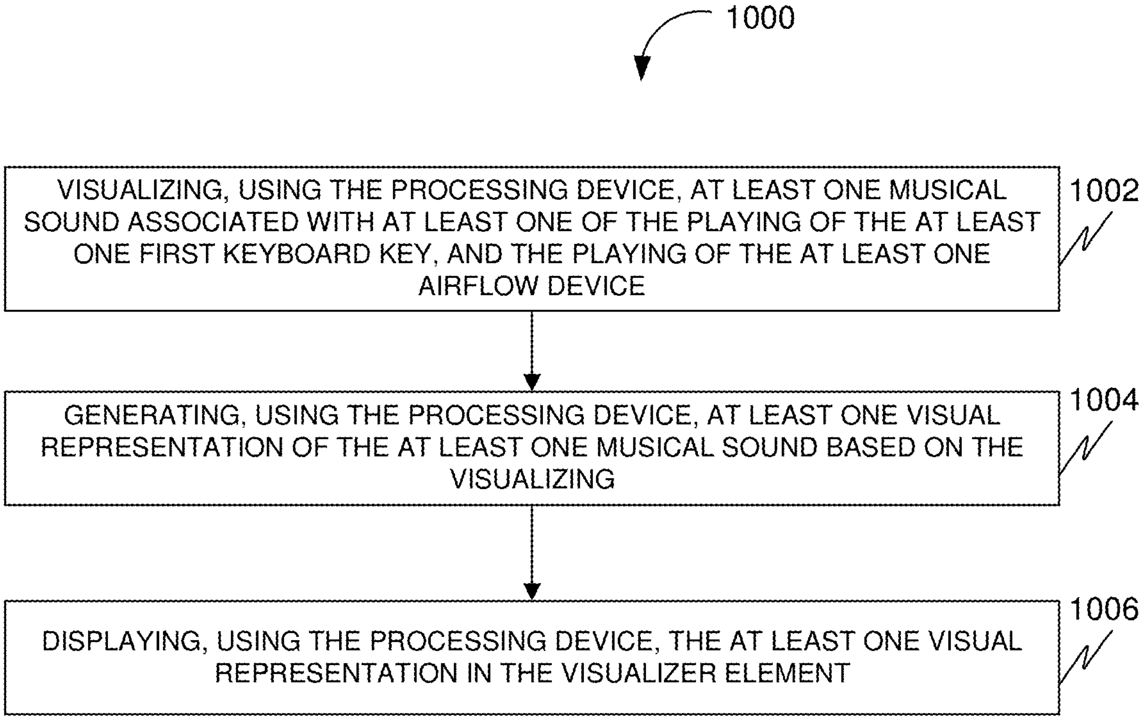

FIG. 10 illustrates a flowchart of a method 1000 for facilitating customizing a production of musical sounds associated with a musical instrument including displaying, using the processing device, the at least one visual representation in the visualizer element, in accordance with some embodiments.

Figure 11:
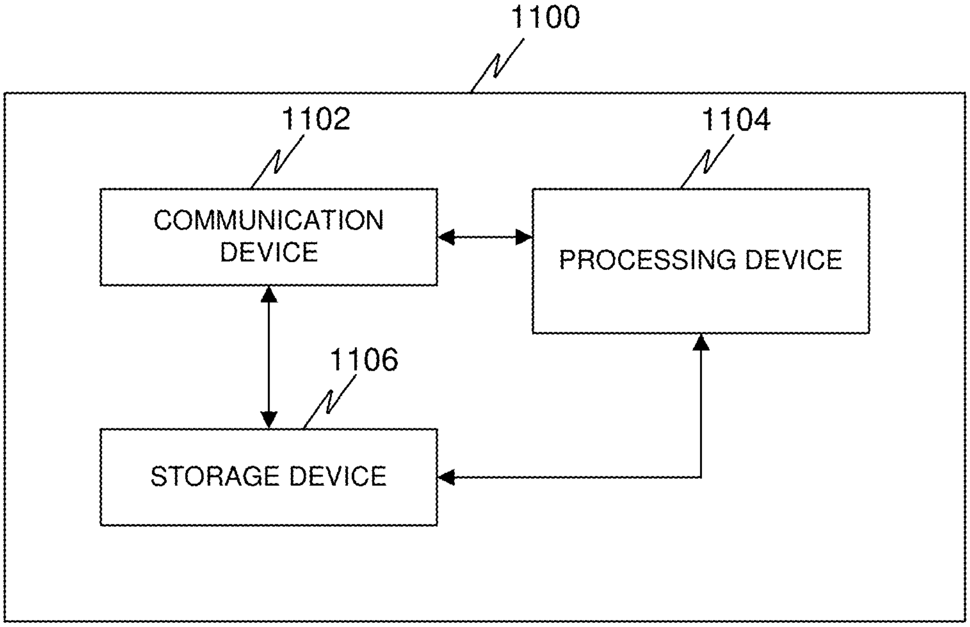

FIG. 11 illustrates a block diagram of a system 1100 for facilitating customizing a production of musical sounds associated with a musical instrument, in accordance with some embodiments.

Figure 12:
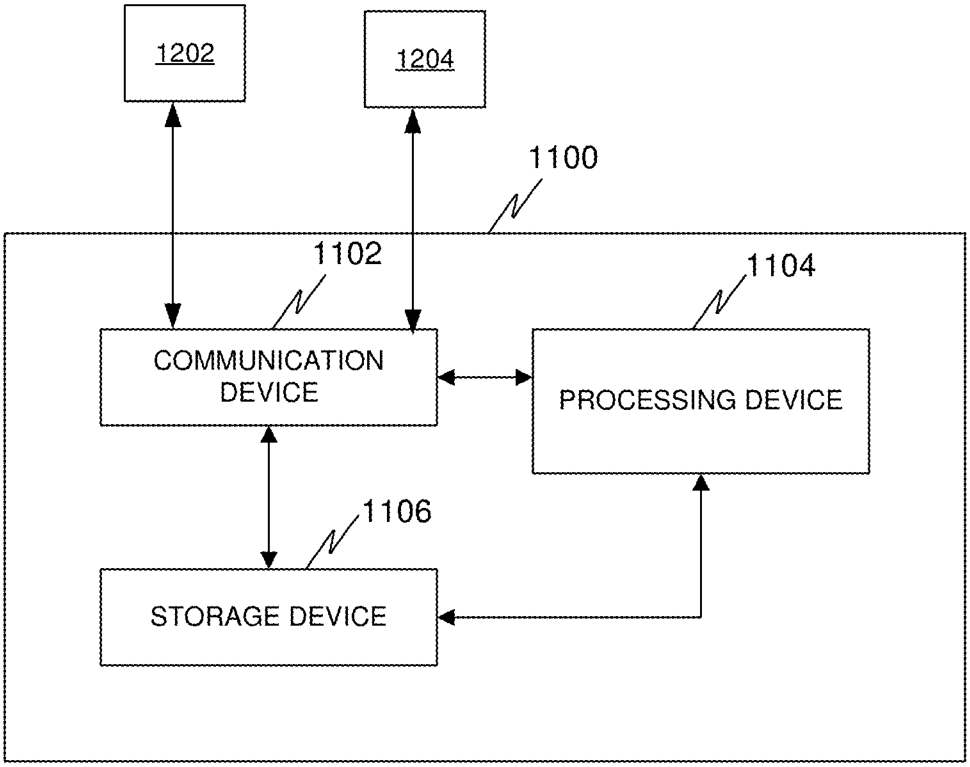

FIG. 12 illustrates a block diagram of the system 1100 for facilitating customizing a production of musical sounds associated with a musical instrument, in accordance with some embodiments.

Figure 13:
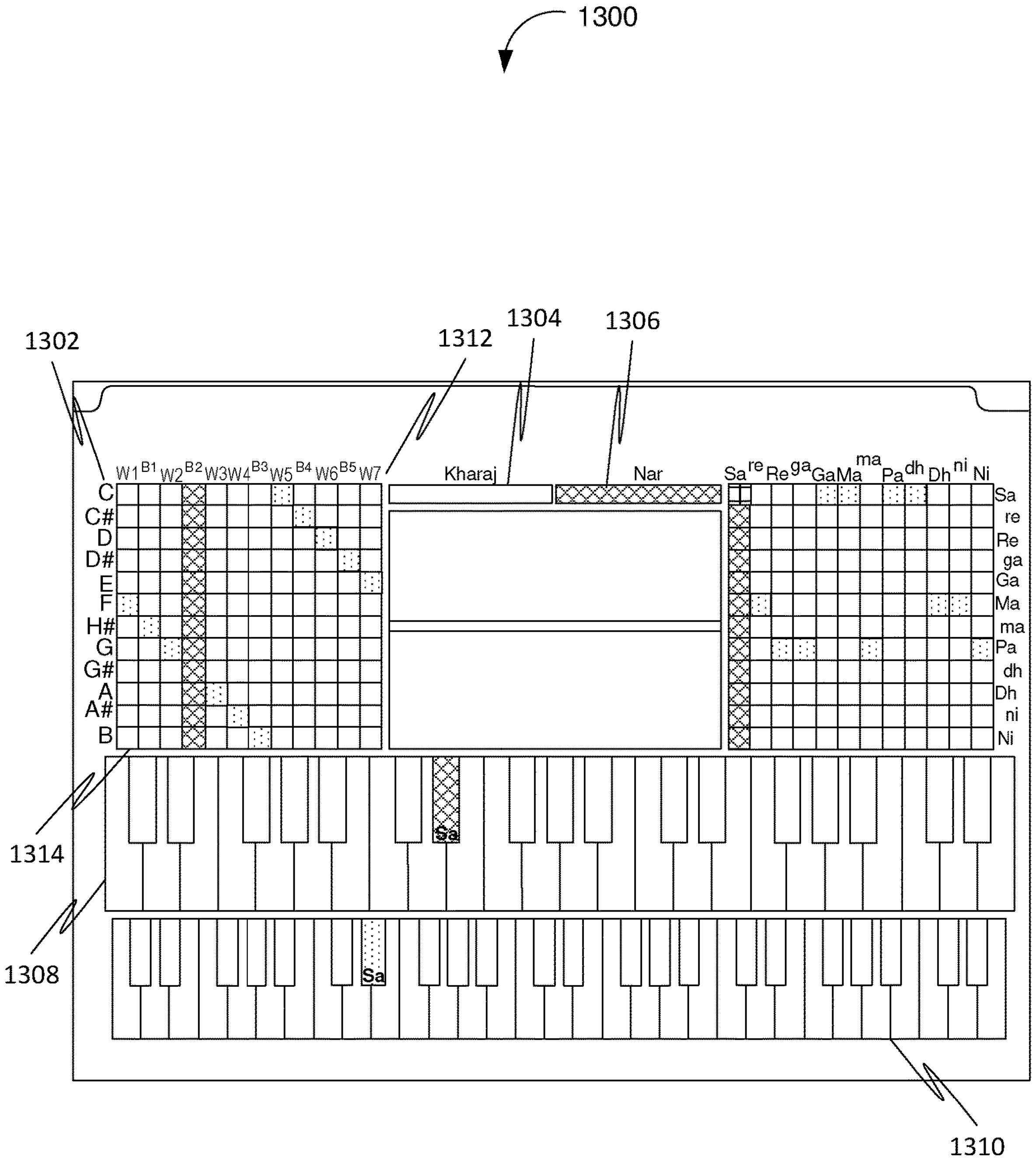

FIG. 13 illustrates a screenshot of a user interface 1300 of a software platform associated with the disclosed system for facilitating customizing a production of musical sounds associated with a musical instrument, in accordance with some embodiments.

Figure 14:
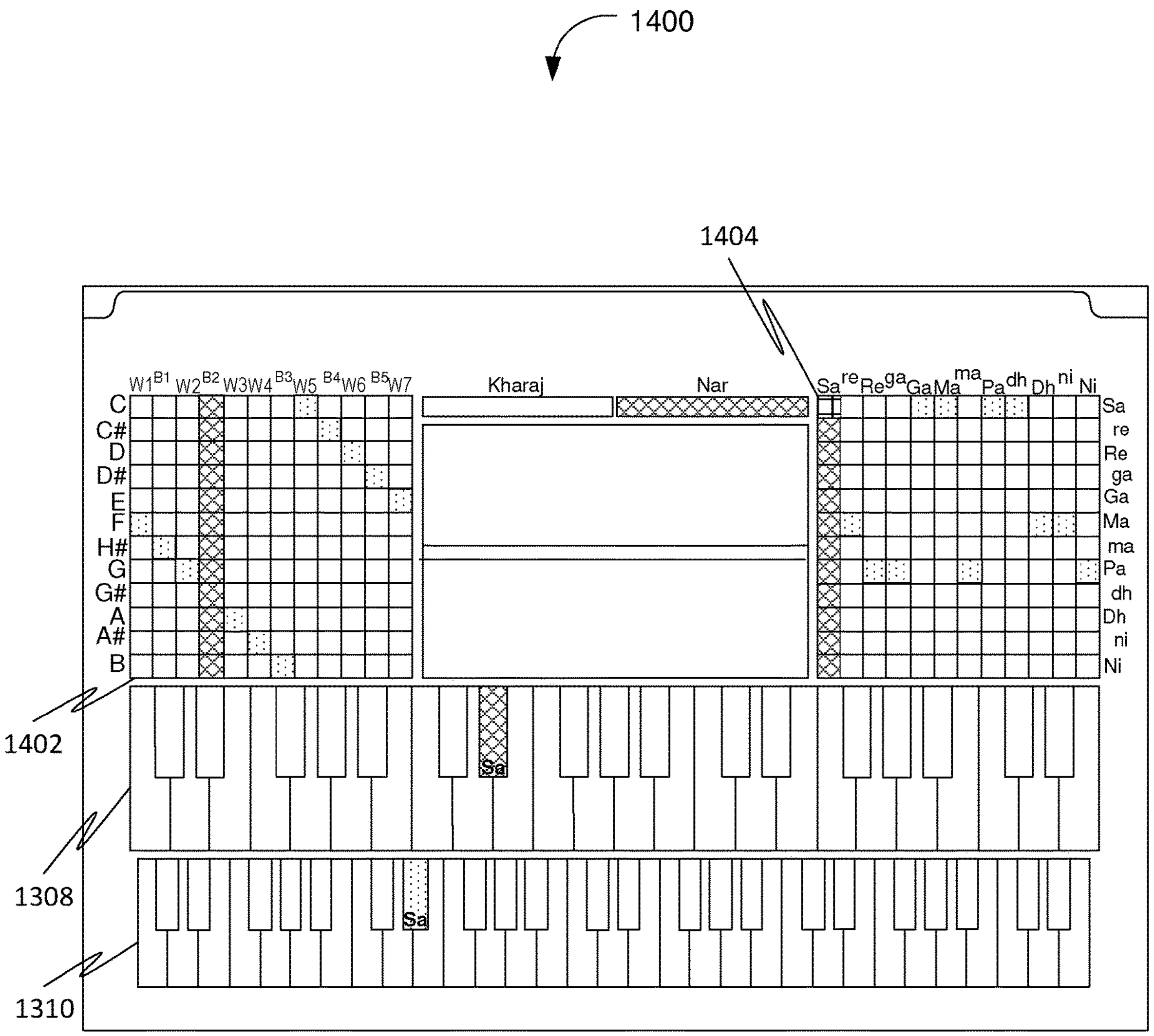

FIG. 14 illustrates a screenshot of a user interface 1400 of the software platform associated with the disclosed system for facilitating customizing a production of musical sounds associated with a musical instrument, in accordance with some embodiments.

Figure 15:
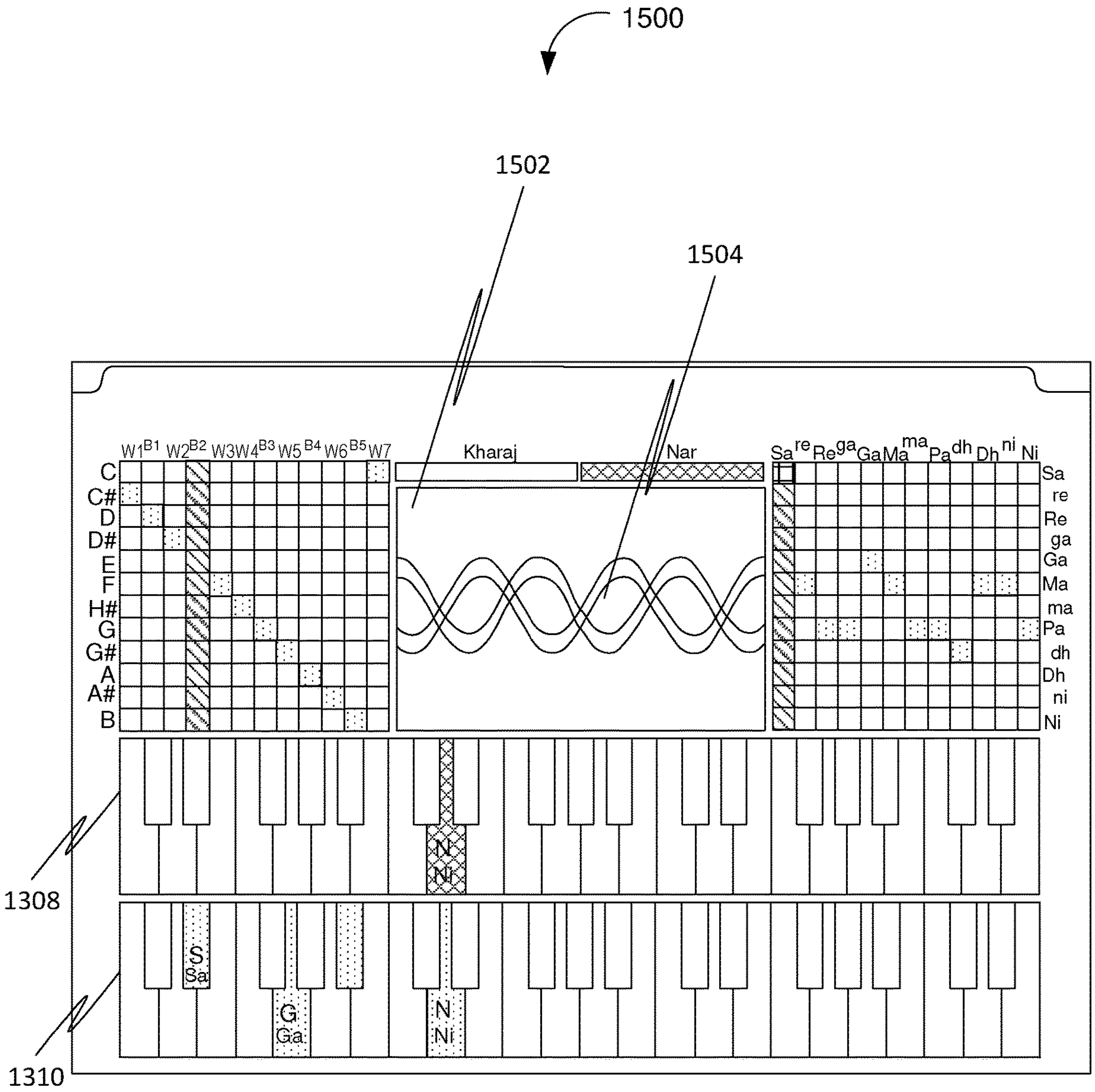

FIG. 15 illustrates a screenshot of a user interface 1500 of the software platform associated with the disclosed system for facilitating customizing a production of musical sounds associated with a musical instrument, in accordance with some embodiments.

DETAILED DESCRIPTION OF DISCLOSURE

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise.

Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, “a” and “an” each generally denotes “at least one,” but does not exclude a plurality unless the contextual use dictates otherwise. When used herein to join a list of items, “or” denotes “at least one of the items,” but does not exclude a plurality of items of the list. Finally, when used herein to join a list of items, “and” denotes “all of the items of the list.”

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of the disclosed use cases, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled, and/or terminated based on a control input received from one or more devices operated by one or more users such as, for example, but not limited to, an end user, an admin, a service provider, a service consumer, an agent, a broker and a representative thereof. Further, the user as defined herein may refer to an individual, a human, an animal, or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer, etc.) and/or possession of a machine readable secret data (e.g. encryption key, decryption key, bar codes, etc.) and/or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera, and so on. Likewise, the one or more steps may include receiving, using the communication device, the one or more embodied characteristics from one or more biometric sensors.

Further, one or more steps of the method may be automatically initiated, maintained, and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data, and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview

The present disclosure describes methods and systems for facilitating customizing a production of musical sounds associated with a musical instrument. Further, the disclosed system may be associated with a software platform (or an application). Further, the app for concisely setting shrutis (microtones), pitch, physical key preference, and physical parameters of an acoustic musical instrument. The app also displays tonal modalities and prime microtonal factors on a visualization of the instrument's physical interface.

Further, the disclosed system may allow a user to set a pitch for a key with one touch.

Further, the disclosed system may be configured to provide a one-touch setup of a physical key (key board key), pitch, and transpose (together), allowing better mental mapping of the three parameters. Further, the disclosed system may be configured to provide a shruti grid to intuitively set microtonal relations between all the 12 swars in a single matrix. Further, the disclosed system may be configured to provide a visualization of the prime microtonal factors in the form of the instrument's physical interface. Further, the disclosed system may be configured to provide a visual representation of the physical parameters of the instrument. Further, the disclosed system may be configured to provide a visual representation of the swars played on the instrument's physical interface. Further, the disclosed system may be configured to adjust a digitally produced sound based on the physical parameters of the instrument.

Further, the disclosed system may be configured to provide a shruti-shruti matrix. Further, the disclosed system may be configured to provide a pitch-key matrix. Further, the disclosed system may be associated with reed (physical modeling) combinations. Further, the disclosed system may be configured to provide a visualization of prime microtonal factors in the form of an instrument's physical interface. Interdependence of all tones (musical note or musical swar) with all other tones is shown in FIG. 13. Further, the disclosed system may allow the user to set relations between two different tones with one touch.

Further, the disclosed system may allow a user to track the interdependency of each swar (musical tone/musical note) with the other tones. Further, two reeds—Kharj octave and Nar octave indicating which reed will be played are shown in FIG. 13. Further, the disclosed system allows both of the two reeds to be played simultaneously. Further, an oscilloscope that may have a wave form that may operate when an instrument is played, is shown in FIGS. 13-15. Further, a standing wave created between the reeds that are been played is displayed in the oscilloscope, as shown in FIG. 15. Further, two keyboards, wherein a top keyboard shows which key is pressed and what is being played on an instrument such as a harmonium, is shown in FIGS. 13-15. Further, a bottom keyboard shows whatever microtones (shruti) are there for the keys or the tones that are being played on the instrument (such as a keyboard).

Further, the disclosed system may be used with any instrument where microtonal frequencies/sounds/shrutis are important.

Figure 1:
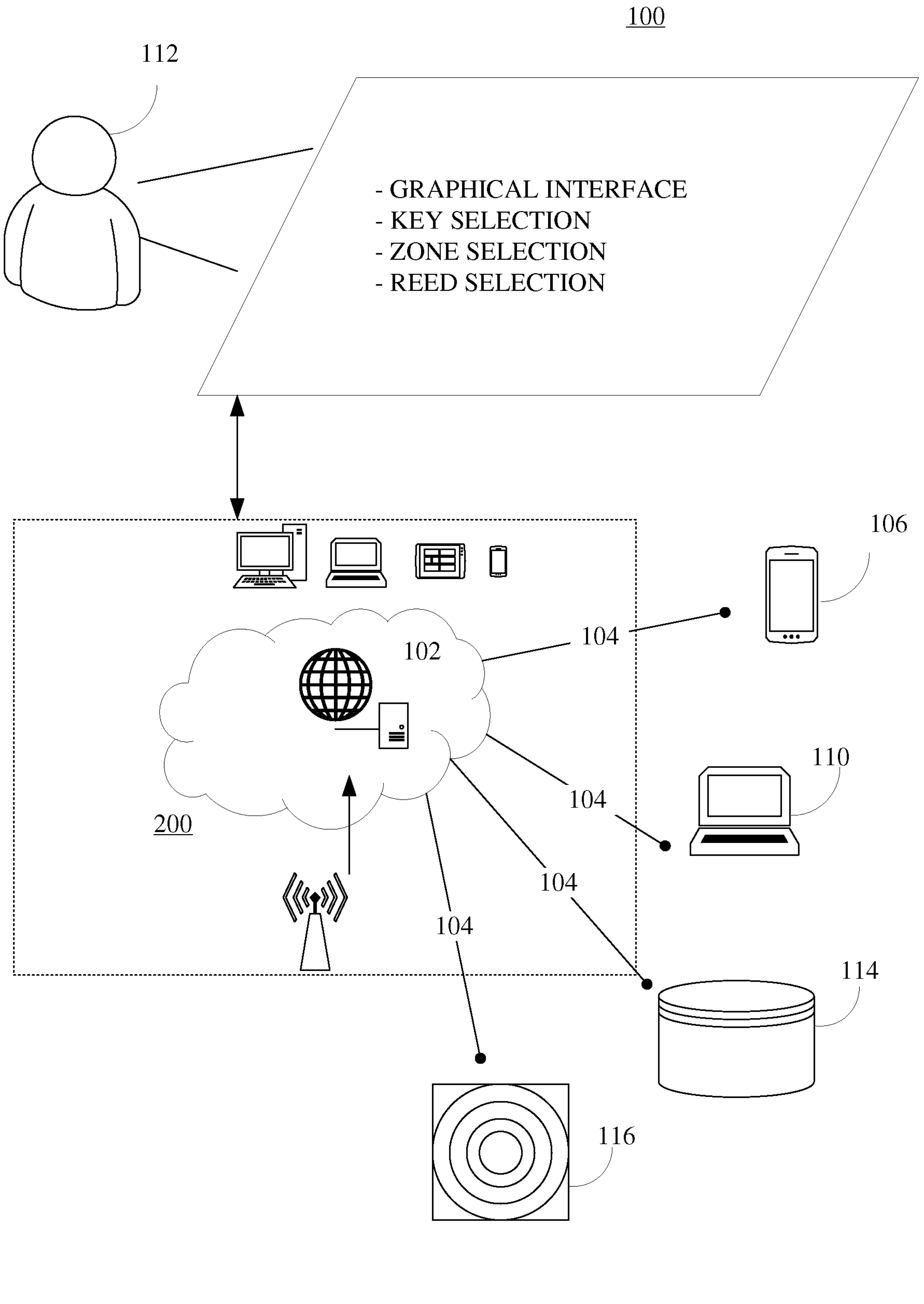
FIG. 1 is an illustration of an online platform 100 consistent with various embodiments of the present disclosure.

FIG. 1 is an illustration of an online platform 100 consistent with various embodiments of the present disclosure. By way of non-limiting example, the online platform 100 to facilitate customizing a production of musical sounds associated with a musical instrument may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, and sensors 116 over a communication network 104, such as, but not limited to, the Internet. Further, users of the online platform 100 may include relevant parties such as, but not limited to, end-users, administrators, service providers, service consumers, and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 200.

Figure 2:
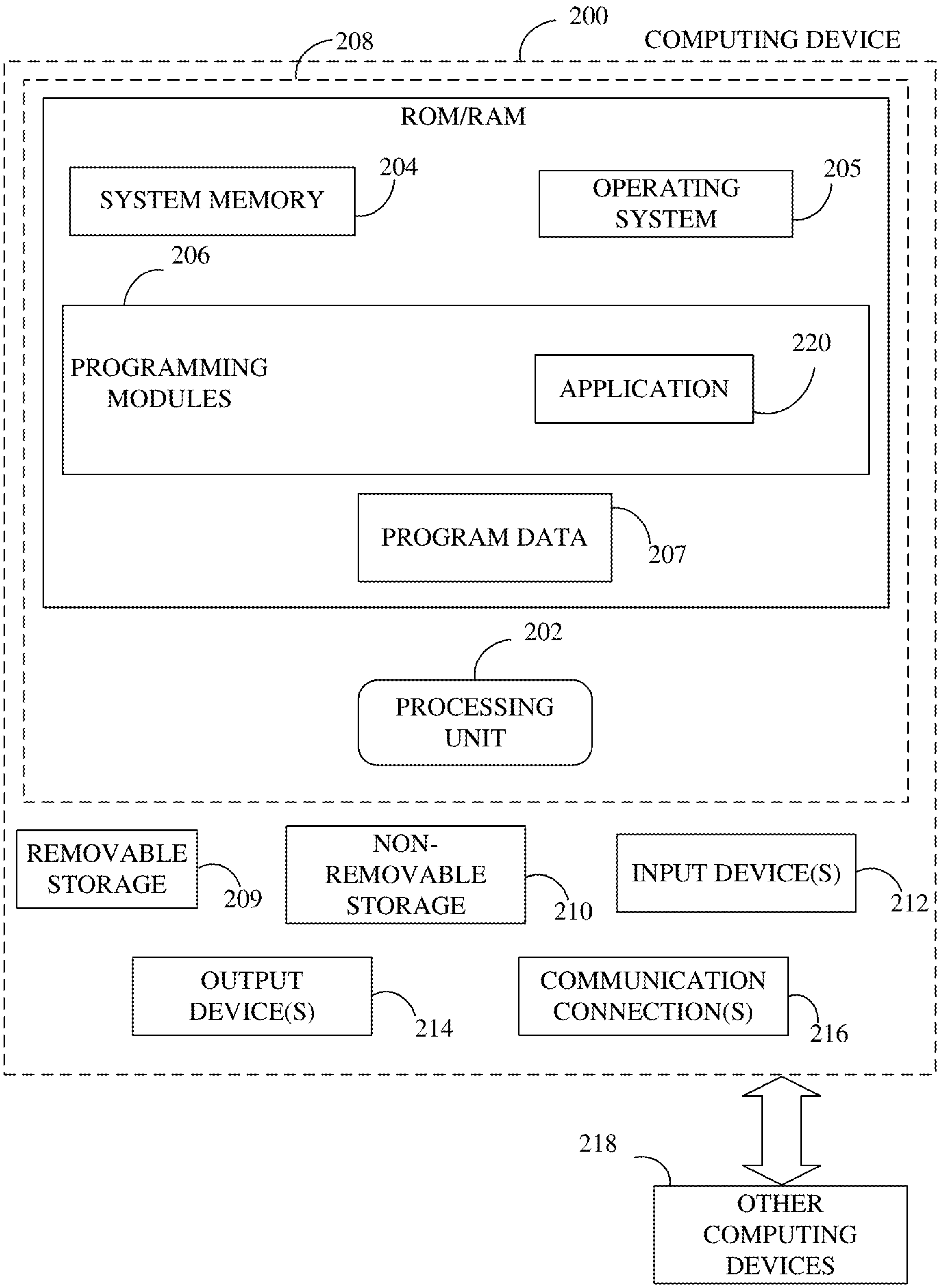
FIG. 2 is a block diagram of a computing device 200 for implementing the methods disclosed herein, in accordance with some embodiments.

With reference to FIG. 2, a system consistent with an embodiment of the disclosure may include a computing device or cloud service, such as computing device 200. In a basic configuration, computing device 200 may include at least one processing unit 202 and a system memory 204. Depending on the configuration and type of computing device, system memory 204 may comprise, but is not limited to, volatile (e.g. random-access memory (RAM)), non-volatile (e.g. read-only memory (ROM)), flash memory, or any combination. System memory 204 may include operating system 205, one or more programming modules 206, and may include a program data 207. Operating system 205, for example, may be suitable for controlling computing device 200's operation. In one embodiment, programming modules 206 may include image-processing module, machine learning module. Furthermore, embodiments of the disclosure may be practiced in conjunction with a graphics library, other operating systems, or any other application program and is not limited to any particular application or system. This basic configuration is illustrated in FIG. 2 by those components within a dashed line 208.

Computing device 200 may have additional features or functionality. For example, computing device 200 may also include additional data storage devices (removable and/or non-removable) such as, for example, magnetic disks, optical disks, or tape. Such additional storage is illustrated in FIG. 2 by a removable storage 209 and a non-removable storage 210. Computer storage media may include volatile and non-volatile, removable and non-removable media implemented in any method or technology for storage of information, such as computer-readable instructions, data structures, program modules, or other data. System memory 204, removable storage 209, and non-removable storage 210 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 200. Any such computer storage media may be part of device 200. Computing device 200 may also have input device(s) 212 such as a keyboard, a mouse, a pen, a sound input device, a touch input device, a location sensor, a camera, a biometric sensor, etc. Output device(s) 214 such as a display, speakers, a printer, etc. may also be included. The aforementioned devices are examples and others may be used.

Computing device 200 may also contain a communication connection 216 that may allow device 200 to communicate with other computing devices 218, such as over a network in a distributed computing environment, for example, an intranet or the Internet. Communication connection 216 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 204, including operating system 205. While executing on processing unit 202, programming modules 206 (e.g., application 220 such as a media player) may perform processes including, for example, one or more stages of methods, algorithms, systems, applications, servers, databases as described above. The aforementioned process is an example, and processing unit 202 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Figure 3A:
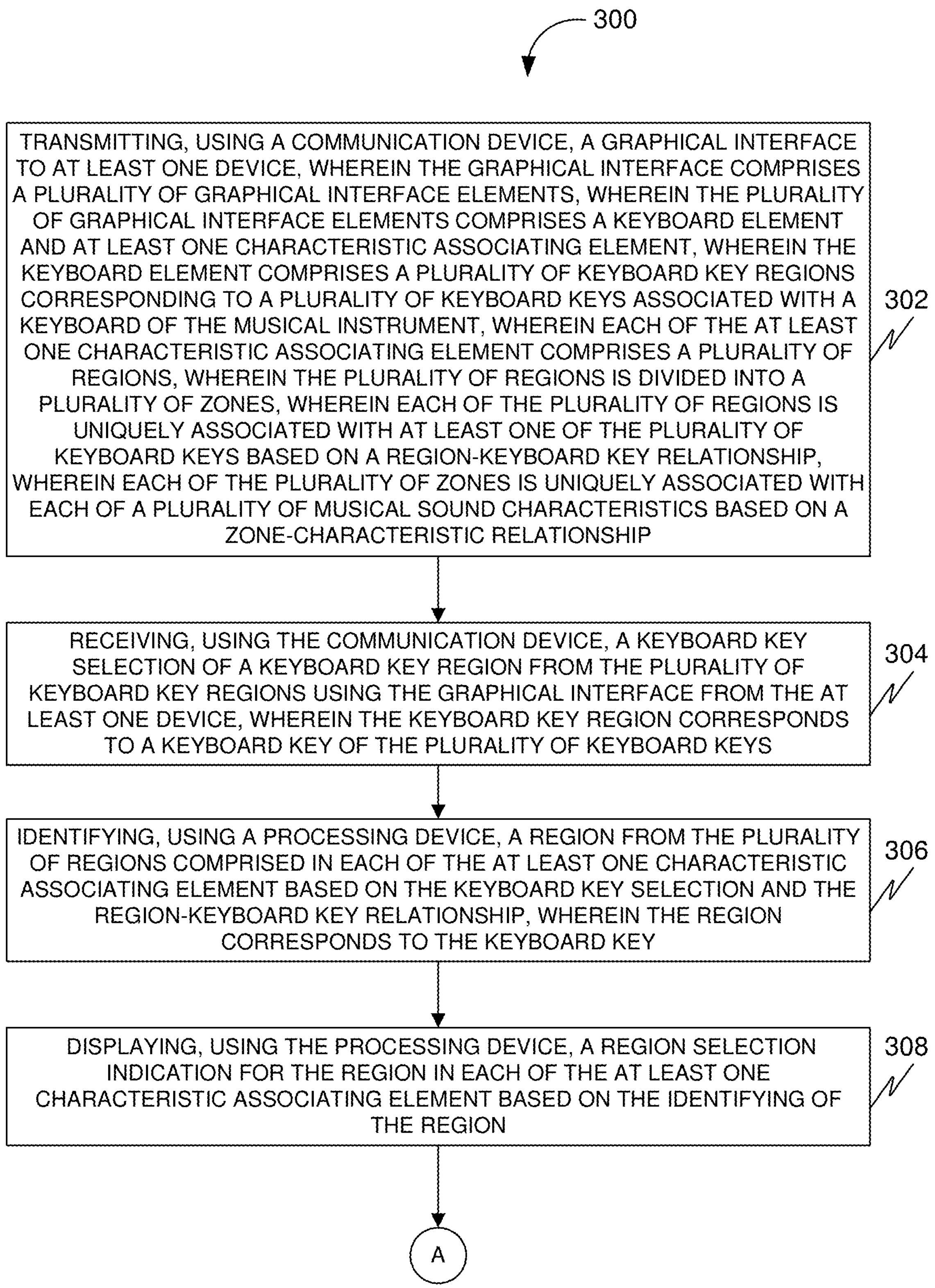
FIG. 3A illustrates a flowchart of a method 300 for facilitating customizing a production of musical sounds associated with a musical instrument, in accordance with some embodiments.
Figure 3B:
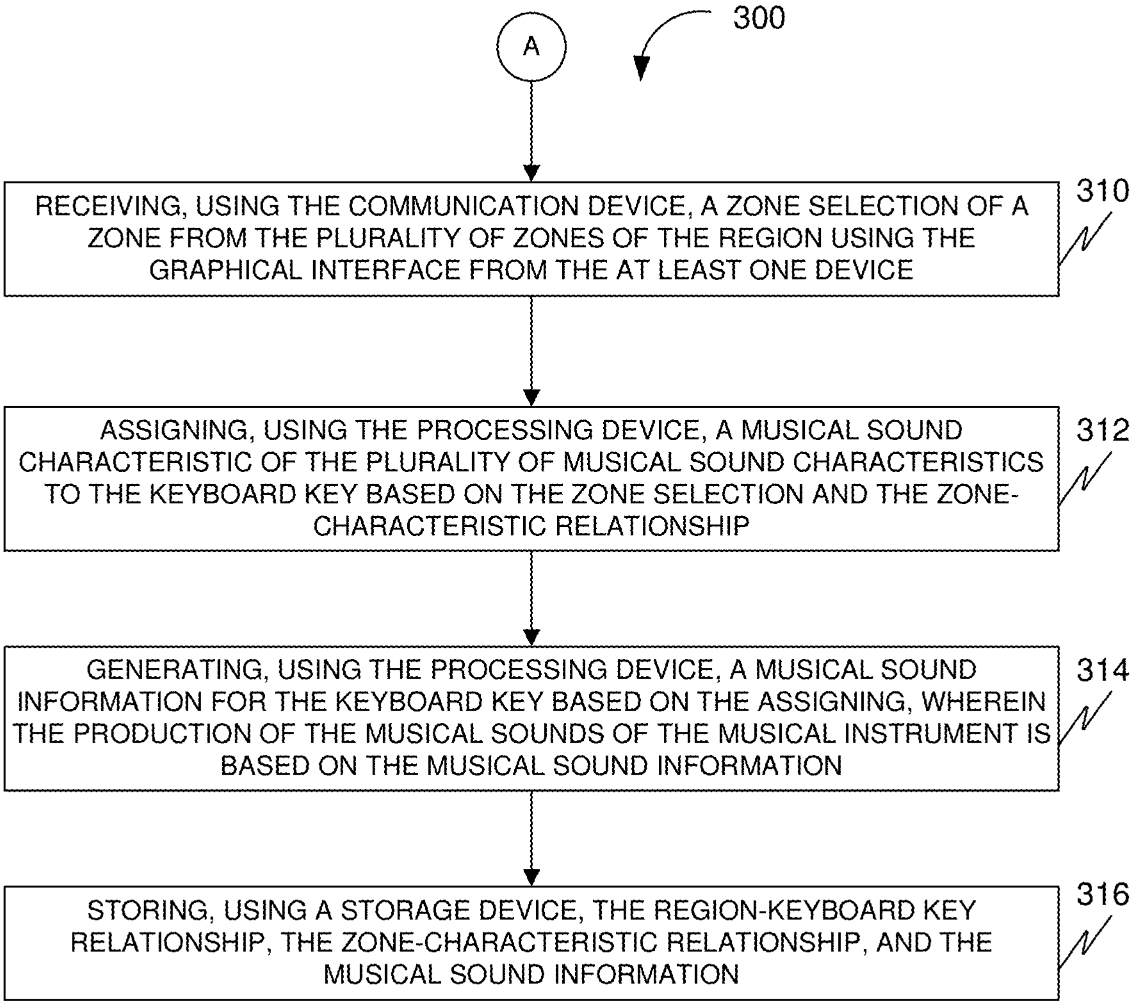
FIG. 3B illustrates a continuation of the flowchart of the method 300 for facilitating customizing a production of musical sounds associated with a musical instrument, in accordance with some embodiments.

FIG. 3A and FIG. 3B illustrate a flowchart of a method 300 for facilitating customizing a production of musical sounds associated with a musical instrument, in accordance with some embodiments.

Accordingly, the method 300 may include a step 302 of transmitting, using a communication device 1102, a graphical interface to one or more devices (such as one or more devices 1202). Further, the graphical interface includes two or more graphical interface elements. Further, the two or more graphical interface elements may include a keyboard element (such as a top keyboard 1308, as shown in FIG. 13) and one or more characteristic associating elements (such as one or more characteristic associating elements 1314, as shown in FIG. 13). Further, the keyboard element includes two or more keyboard key regions corresponding to two or more keyboard keys associated with a keyboard of the musical instrument (such as a musical instrument 1204, as shown in FIG. 12). Further, each of the one or more characteristic associating elements includes two or more regions. Further, the two or more regions may be divided into two or more zones. Further, each of the two or more regions may be uniquely associated with one or more of the two or more keyboard keys based on a region-keyboard key relationship. Further, each of the two or more zones may be uniquely associated with each of two or more musical sound characteristics based on a zone-characteristic relationship. Further, the two or more musical sound characteristics may include a plurality of musical pitches, a plurality of musical tones, a plurality of musical timbre, a plurality of musical frequencies, a plurality of musical waveforms, a plurality of musical harmonics, a plurality of musical volumes, a plurality of musical notes (musical swars), etc. Further, the graphical interface may include a user interface, a graphical user interface, etc. Further, the one or more devices may include a computing device, a user device, a client device, etc. Further, the two or graphical interface elements may include a component, a portion, etc. of the graphical interface. Further, the keyboard element may include a graphical/visual representation of the keyboard of the musical instrument. Further, the musical instrument may include a reed musical instrument. Further, the musical instrument may include a harmonium, a dual reed harmonium, an accordion, a melodeon, a concertina, a bandoneon, a bagpipe, a piano, etc. Further, the musical instrument may include an augmented electronic acoustic harmonium. Further, the one or more characteristic associating elements may include a pitch-vs-key grid. Further, the pitch-vs-key grid may include two or more columns and two or more rows. Further, the two or more columns may correspond to the two or more regions, and the two or more rows may correspond to the two or more zones. Further, the two or more rows may be associated with two or more keyboard key identifiers of the two or more keyboard keys. Further, the two or more keyboard key identifiers may include W1, B1, W2, B2, W3, W4, B3, W5, B4, W6, B5, and W7. Further, the two or more columns may be associated with two or more musical pitches (pitches). Further, the musical pitches may include C, C #, D, D #, E, F, F #, G, G #, A, A #, and B. Further, the one or more characteristic associating elements may include a swar-swar interdependence grid. Further, the swar-swar interdependence grid may include two or more columns and two or more rows. Further, the two or more columns may correspond to the two or more regions, and the two or more rows may correspond to the two or more zones. Further, the two or more columns may be associated with two or more musical swars. Further, the two or more musical swars may include Sa, re, Re, ga, Ga, Ma, Ma #, Pa, dh, Dh, ni, and Ni. Further, the two or more rows may be associated with two or more musical swars. Further, the two or more musical swars may include Sa, re, Re, ga, Ga, Ma, Ma #, Pa, dh, Dh, ni, and Ni. Further, the region-keyboard key relationship may include an association dependency of each of the two or more regions with one or more keyboard key regions of the two or more keyboard key regions. Further, the zone-characteristic relationship may include an association dependency of each of the two or more zones with one or more musical sound characteristics of the two or more musical sound characteristics. Further, the two or more musical sound characteristics may include two or more musical pitches, two or more musical notes (swars) (such as musical tones), etc. Further, the musical instrument may include a body and a device. Further, the body may include an airflow device and at least one sound producing element. Further, the at least one sound producing element may include at least one reed.

Further, the body may include the keyboard. Further, the airflow device may be configured for establishing an airflow in an interior of the body. Further, the device may be configured to be implemented in the body. Further, the device may include at least one internal sensor (such as air pressure sensor, airflow sensor, etc.), a processing device, a storage device, and at least one output device. Further, the at least one internal sensor may be disposed in the interior of the body. Further, the at least one internal sensor may be configured for detecting at least one characteristic associated with the airflow. Further, the processing device may be communicatively coupled the at least one internal sensor. Further, the processing device may be configured for generating an airflow information based on the detecting of the at least one characteristic associated with the airflow in the interior of the body. Further, the processing device may be configured for synthesizing at least one musical sound using at least one reed data associated with the at least one reed based on the airflow information and the musical sound information. Further, the storage device may be communicatively coupled with the processing device. Further, the storage device may be configured for storing the at least one reed data. Further, the at least one reed data represents at least one acoustic model of at least one sound produced by the at least one reed. Further, the at least one reed may be associated with a reed bank. Further, the at least one output device may be communicatively coupled with the processing device. Further, the at least one output device may be configured for producing the at least one musical sound based on the synthesizing of the at least one musical sound. Further, the at least one output device may include a speaker. Further, in some embodiments, the at least one reed may be blockable using at least one blocking element. Further, the at least one blocking element may include a piece of paper to prevent a vibration of a tongue of the at least one reed. Further, the at least one reed produces the musical sound based on a vibration of the reed strip. Further, the at least one blocking element prevents the vibration of the reed strip. Further, the at least one blocking element may be placed under the reed strip near the free end of the reed strip. Further, the at least one blocking element may be a piece of paper, a strip of paper, etc.

Further, the method 300 may include a step 304 of receiving, using the communication device 1102, a keyboard key selection of a keyboard key region from the two or more keyboard key regions using the graphical interface from the one or more devices. Further, the keyboard key region corresponds to a keyboard key of the two or more keyboard keys. Further, the one or more devices may include one or more input devices. Further, the one or more input devices receive one or more inputs from a user and generate the keyboard key selection. Further, the one or more inputs may include a touching action, a pressing action, a playing action, etc. Further, the one or more devices may include the musical instrument. Further, the device of the musical instrument may include at least one switch (switch sensor). Further, the at least one switch detects the playing action corresponding to the keyboard key and generates the keyboard key selection. Further, the keyboard key selection selects the keyboard key region of the two or more keyboard key regions. Further, the keyboard key selection may be received from the musical instrument based on a pressing of the keyboard key of the two or more keyboard keys of the keyboard of the musical instrument. Further, the keyboard key selection corresponds to the pressing of the keyboard key. Further, the at least one switch comprised in the musical instrument detects the pressing of the keyboard key and generates the keyboard key selection.

Further, the method 300 may include a step 306 of identifying, using a processing device (such as a processing device 1104), a region from the two or more regions comprised in each of the one or more characteristic associating elements based on the keyboard key selection and the region-keyboard key relationship. Further, the region corresponds to the keyboard key.

Further, the method 300 may include a step 308 of displaying, using the processing device, a region selection indication for the region in each of the one or more characteristic associating elements based on the identifying of the region. Further, the region selection indication may include a colored line or bar displayed on the region. Further, the region selection indication highlights the region. Further, the region selection indication corresponds to a key of choice of the two or more keyboard keys. Further, the displaying may include causing a display on the graphical interface.

Further, the method 300 may include a step 310 of receiving, using the communication device 1102, a zone selection of a zone from the two or more zones of the region using the graphical interface from the one or more devices. Further, the zone selection selects the zone of the two or more zones.

Further, the method 300 may include a step 312 of assigning, using the processing device, a musical sound characteristic of the two or more musical sound characteristics to the keyboard key based on the zone selection and the zone-characteristic relationship.

Further, the method 300 may include a step 314 of generating, using the processing device, a musical sound information for one or more of the two or more keyboard keys based on the assigning. Further, the production of the musical sounds of the musical instrument may be based on the musical sound information. Further, the musical sound information comprises a frequency information associated with a frequency of the musical sound, a timbre information associated with a timbre of the musical sound, etc. Further, a base frequency for the keyboard key may be determined based on a musical pitch for the keyboard key. Further, the base frequency is varied based on an interdependence of a musical note for the keyboard key with one or more musical notes to obtain the frequency of the musical sound. Further, the base frequency may be combined with one or more additional frequencies based on the interdependence of a musical note for the keyboard key with one or more musical notes to obtain the frequency of the musical sound.

Further, the method 300 may include a step 316 of storing, using a storage device 1106, the region-keyboard key relationship, the zone-characteristic relationship, and the musical sound information. Further, the two or more musical sound characteristics may be stored.

In some embodiments, the one or more characteristic associating elements include a first characteristic associating element (such as a first characteristic associating element 1402, as shown in FIG. 14) and a second characteristic associating element (such as a second characteristic associating element 1404, as shown in FIG. 14). Further, the first characteristic associating element may include the pitch-vs-key grid, and the second characteristic associating element may include the swar-swar interdependence grid. Further, the two or more regions include a first two or more regions and a second two or more regions. Further, the first two or more regions may be associated with the two or more keyboard key identifiers, and the second two or more regions may be associated with the two or more musical swars. Further, the two or more zones include a first two or more zones and a second two or more zones. Further, the first two or more zones may be associated with the two or more musical pitches. Further, the second two or more zones may be associated with the two or more musical swars. Further, the first two or more regions may be divided into the first two or more zones and the second two or more regions may be divided into the second two or more zones. Further, the two or more musical sound characteristics may include a first two or more musical sound characteristics and a second two or more musical sound characteristics. Further, the first two or more musical sound characteristics may include the two or more musical pitches, and the second two or more musical sound characteristics may include the two or more musical swars. Further, the region-keyboard key relationship includes a first region-keyboard key relationship and a second region-keyboard key relationship. Further, each of the first two or more regions may be uniquely associated with one or more of the two or more keyboard keys based on the first region-keyboard key relationship, and each of the second two or more regions may be uniquely associated with one or more of the two or more keyboard keys based on the second region-keyboard key relationship. Further, the zone-characteristic relationship includes a first zone-characteristic relationship and a second zone-characteristic relationship. Further, each of the first two or more zones may be uniquely associated with each of the first plurality of musical sound characteristics based on the first zone-characteristic relationship, and each of the second two or more zones may be uniquely associated with each of the second two or more musical sound characteristics based on the second zone-characteristic relationship. Further, the identifying of the region from the two or more regions includes identifying a first region from the first two or more regions based on the keyboard key selection and the first region-keyboard key relationship, and a second region from the second two or more regions based on the keyboard key selection and the second region-keyboard key relationship. Further, the first region and the second region correspond to the keyboard key. Further, the displaying of the region selection indication for the region in each of the one or more characteristic associating elements includes displaying a first region selection indication for the first region in the first characteristic associating element, and a second region selection indication for the second region in the second characteristic associating element. Further, the receiving of the zone selection of the zone from the two or more zones of the region using the graphical interface includes receiving a first zone selection of the first zone from the first two or more zones of the first region, and a second zone selection of the second zone from the second two or more zones using the graphical interface from the one or more devices. Further, the first zone and the second zone correspond to the keyboard key. Further, the assigning of the musical sound characteristic of the two or more musical sound characteristics uniquely to one or more of the two or more keyboard keys includes assigning a first musical sound characteristic of the first two or more musical sound characteristics uniquely to one or more of the two or more keyboard keys based on the first zone selection and the first zone-characteristic relationship, and a second musical sound characteristic of the second two or more musical sound characteristics uniquely to one or more of the two or more keyboard keys based on the second zone selection and the second zone-characteristic relationship. Further, the generating of the musical sound information for the keyboard key may be based on the assigning of the first musical sound characteristic of the first two or more musical sound characteristics to the keyboard key based on the first zone selection and the first zone-characteristic relationship, and the second musical sound characteristic of the second two or more musical sound characteristics to the keyboard key based on the second zone selection and the second zone-characteristic relationship.

In some embodiments, each of the first two or more regions may be uniquely associated with each of two or more keyboard key identifiers (such as two or more keyboard key identifiers 1312). Further, each of the two or more keyboard key identifiers may be uniquely associated with one or more of the two or more keyboard keys based on an identifier-keyboard key relationship. Further, the first two or more musical sound characteristics may include two or more musical pitches. Further, each of the two or more musical pitches may be uniquely associated each of the first two or more zones, Further, the identifier-keyboard key relationship may include an association dependency between each of the two or more keyboard key identifiers and one or more keyboard keys of the two or more keyboard keys. Further, each of the second two or more regions may be uniquely associated with two or more musical notes. Further, the two or more musical notes may include musical swars. Further, each of the two or more musical notes may be uniquely associated with one or more of the two or more keyboard keys based on a note-keyboard key relationship. Further, the note-keyboard key relationship may include an association dependency between each of the two or more musical notes and one or more keyboard keys of the two or more keyboard keys. Further, the second two or more musical sound characteristics may include two or more first musical notes.

Further, each of the two or more first musical notes may be uniquely associated each of the second two or more zones. Further, the generating of the musical sound information for the keyboard key may be based on the identifier-keyboard key relationship and the note-keyboard key relationship. Further, the method 300 may include storing, using the storage device, the identifier-keyboard key relationship, and the note-keyboard key relationship.

Figure 4:
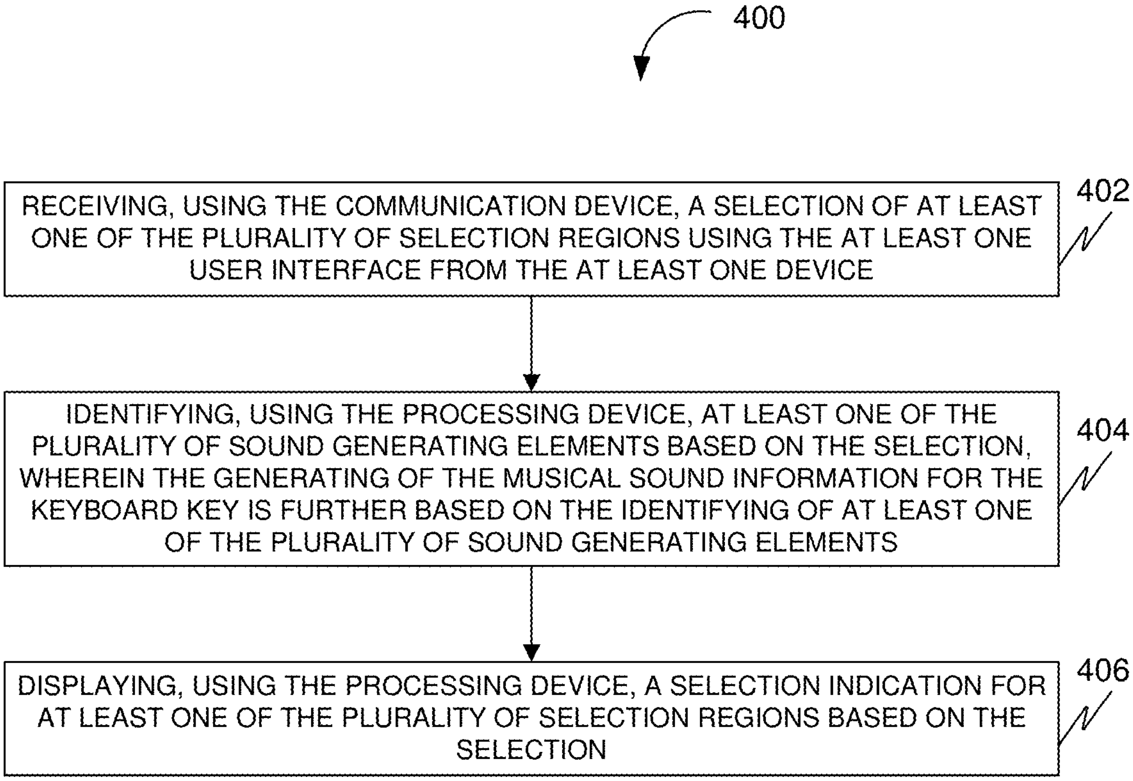
FIG. 4 illustrates a flowchart of a method 400 for facilitating customizing a production of musical sounds associated with a musical instrument including displaying, using the processing device, a selection indication for at least one of the plurality of selection regions, in accordance with some embodiments.

FIG. 4 illustrates a flowchart of a method 400 for facilitating customizing a production of musical sounds associated with a musical instrument including displaying, using the processing device, a selection indication for at least one of the plurality of selection regions, in accordance with some embodiments.

Further, in some embodiments, the two or more graphical interface elements may include a selection element. Further, the selection element may include two or more selections regions corresponding to two or more sound generating elements. Further, the two or more sound generating elements may include reed banks, strings, etc. Further, the selection element may include a reed selection element. Further, the reed selection element may include two or more reed type regions corresponding to two or more reed banks of the musical instrument. Further, the two or more reed banks may include a kharaj reed bank, a Nar reed bank, etc. Further, each of the two or more reed banks corresponds to a specific sounding set of reeds. Further, the specific sounding set of reeds may be male, female, bass, tenor, etc. Further, each of the two or more reed banks corresponds to a reed bank type. Further, the reed bank type may include a nar type, a Kharaj type, etc. Further, each of the two or more sound generating elements may be associated with the two or more keyboard keys. Further, the method 400 may include a step 402 of receiving, using the communication device 1102, a selection of one or more of the two or more selection regions using the one or more user interfaces from the one or more devices. Further, the method 400 may include a step 404 of identifying, using the processing device, one or more of the two or more sound generating elements based on the selection. Further, the generating of the musical sound information for the keyboard key may be based on the identifying of one or more of the two or more sound generating elements. Further, the generating of the musical sound information for the may be based on two or more reed bank data associated with the two or more reed banks. Further, the method 400 may include a step 406 of displaying, using the processing device, a selection indication for one or more of the two or more selection regions based on the selection. Further, the method 400 may include storing, using the storage device, the two or more reed bank data. Further, the reed bank selection highlights one or more of the two or more reed banks.

Figure 5:
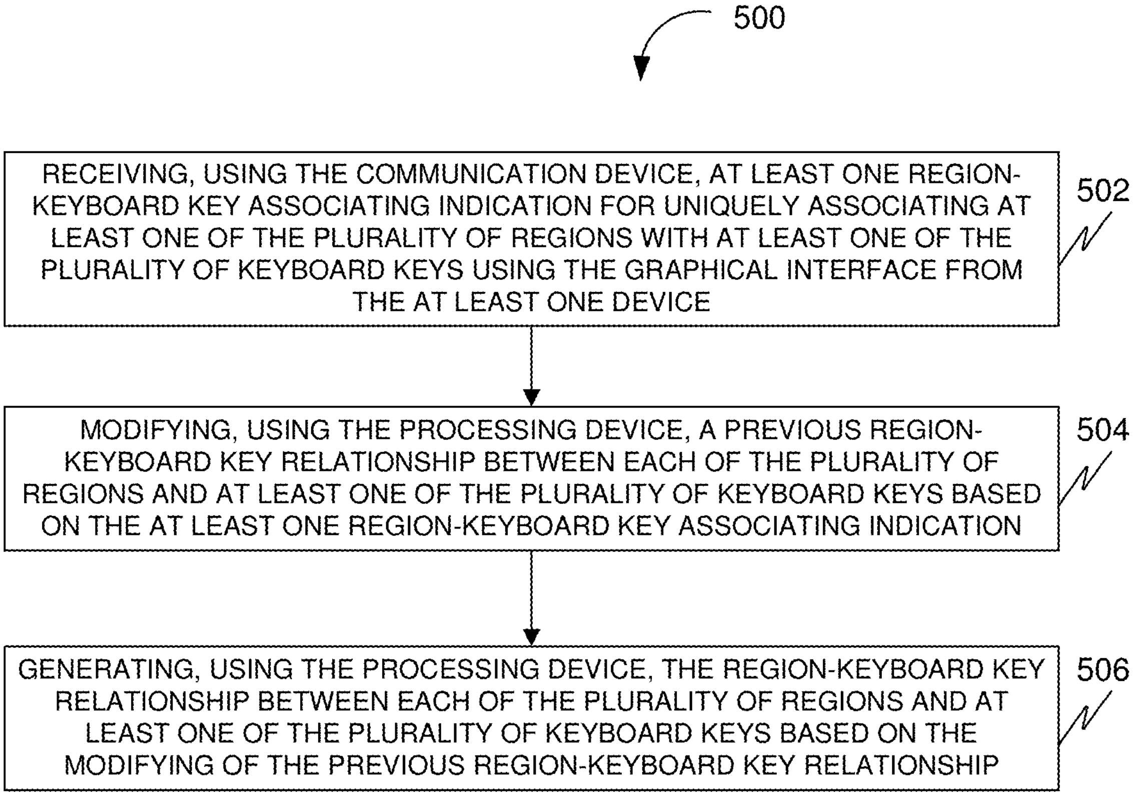
FIG. 5 illustrates a flowchart of a method 500 for facilitating customizing a production of musical sounds associated with a musical instrument including generating, using the processing device, the region-keyboard key relationship between each of the two or more regions and at least one of the plurality of keyboard keys, in accordance with some embodiments.

FIG. 5 illustrates a flowchart of a method 500 for facilitating customizing a production of musical sounds associated with a musical instrument including generating, using the processing device, the region-keyboard key relationship between each of the two or more regions and at least one of the plurality of keyboard keys, in accordance with some embodiments.

Further, in some embodiments, the method 500 may include a step 502 of receiving, using the communication device 1102, one or more region-keyboard key associating indications for uniquely associating one or more of the two or more regions with one or more of the two or more keyboard keys using the graphical interface from the one or more devices. Further, in some embodiments, the method 500 may include a step 504 of modifying, using the processing device, a previous region-keyboard key relationship between each of the two or more regions and one or more of the two or more keyboard keys based on the one or more region-keyboard key associating indications. Further, in some embodiments, the method 500 may include a step 506 of generating, using the processing device, the region-keyboard key relationship between each of the two or more regions and one or more of the two or more keyboard keys based on the modifying of the previous region-keyboard key relationship.

Figure 6:
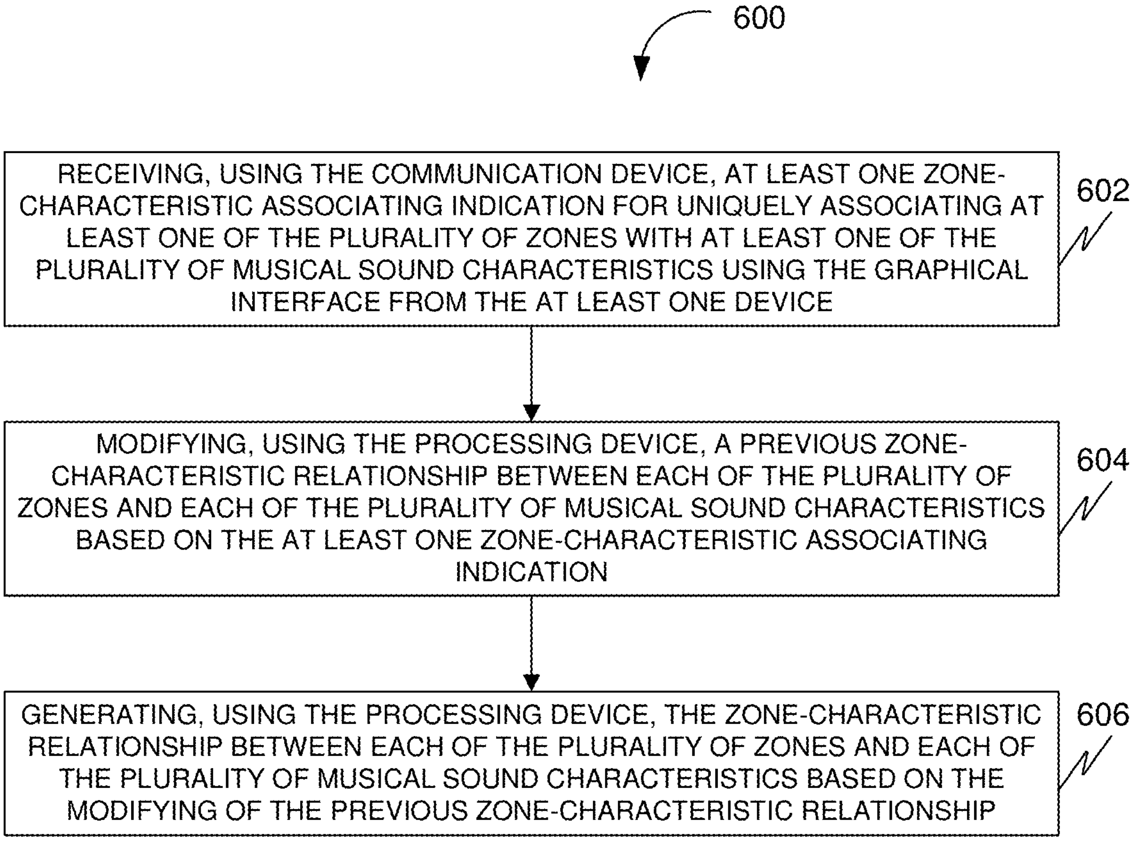
FIG. 6 illustrates a flowchart of a method 600 for facilitating customizing a production of musical sounds associated with a musical instrument including generating, using the processing device, the zone-characteristic relationship between each of the plurality of zones and each of the plurality of musical sound characteristics, in accordance with some embodiments.

FIG. 6 illustrates a flowchart of a method 600 for facilitating customizing a production of musical sounds associated with a musical instrument including generating, using the processing device, the zone-characteristic relationship between each of the plurality of zones and each of the plurality of musical sound characteristics, in accordance with some embodiments.

Further, in some embodiments, the method 600 may include a step 602 of receiving, using the communication device 1102, one or more zone-characteristic associating indications for uniquely associating one or more of the two or more zones with one or more of the two or more musical sound characteristics using the graphical interface from the one or more devices. Further, in some embodiments, the method 600 may include a step 604 of modifying, using the processing device, a previous zone-characteristic relationship between each of the two or more zones and each of the two or more musical sound characteristics based on the one or more zone-characteristic associating indications. Further, in some embodiments, the method 600 may include a step 606 of generating, using the processing device, the zone-characteristic relationship between each of the two or more zones and each of the two or more musical sound characteristics based on the modifying of the previous zone-characteristic relationship.

Figure 7:
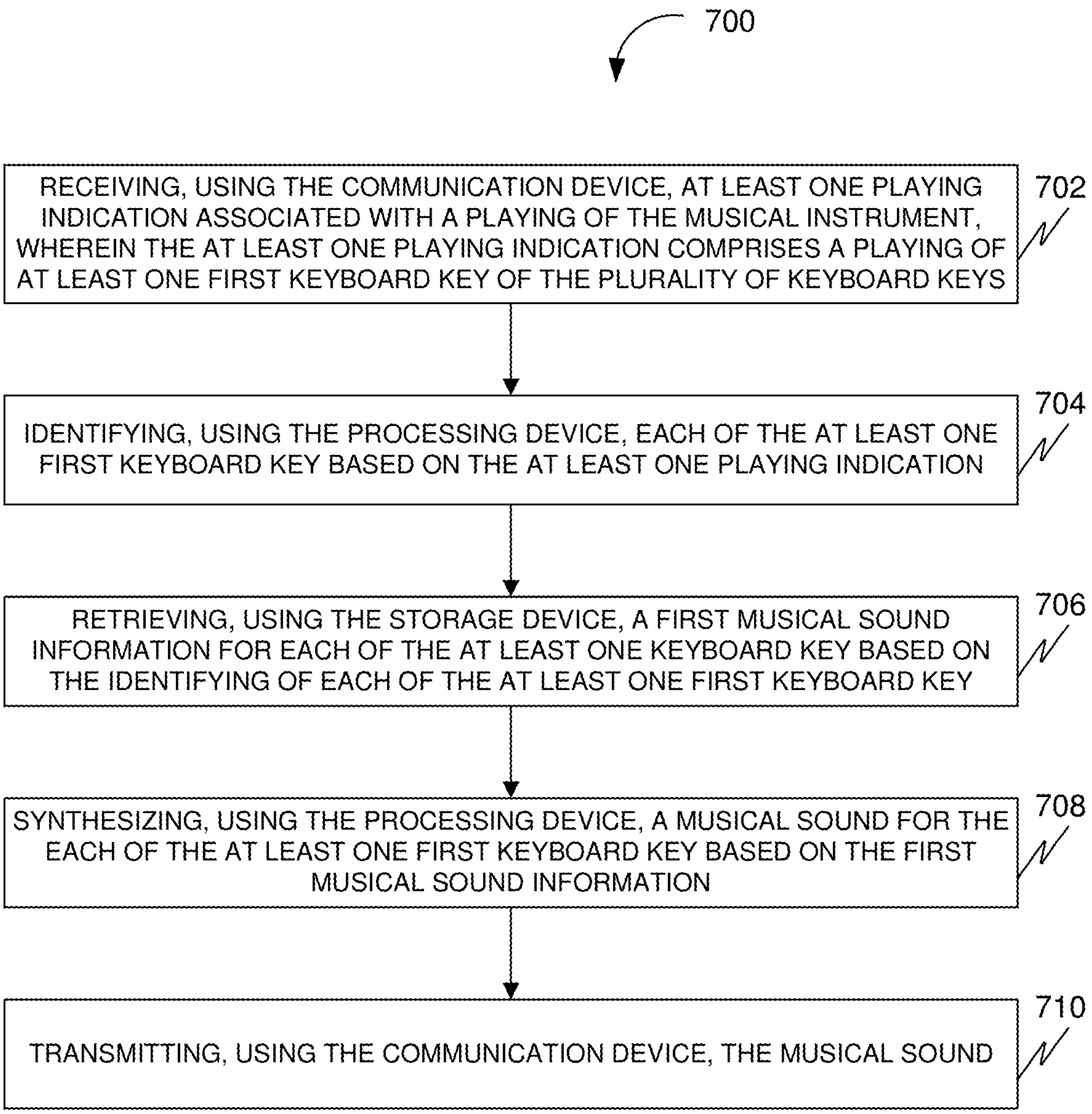
FIG. 7 illustrates a flowchart of a method 700 for facilitating customizing a production of musical sounds associated with a musical instrument including synthesizing, using the processing device, a musical sound for the each of the at least one first keyboard key, in accordance with some embodiments.

FIG. 7 illustrates a flowchart of a method 700 for facilitating customizing a production of musical sounds associated with a musical instrument including synthesizing, using the processing device, a musical sound for the each of the at least one first keyboard key, in accordance with some embodiments.

Further, in some embodiments, the method 700 may include a step 702 of receiving, using the communication device 1102, one or more playing indications associated with a playing of the musical instrument. Further, in an embodiment, the one or more playing indications associated with the playing of the musical instrument may be received from the one or more devices. Further, the one or more playing indications may include a playing action for the two or more keyboard keys based on an interaction with the two or more keyboard key regions. Further, the interaction may include a touching action for the two or more keyboard key regions. Further, in an embodiment, the one or more playing indications associated with the playing of the musical instrument may be received form the musical instrument. Further, the one or more playing indications may include an interaction with the two or more keyboard keys of the keyboard of the musical instrument. Further, the interaction may include a pressing action on the two or more keyboard keys.

Further, the one or more playing indications may include a playing of one or more first keyboard keys of the two or more keyboard keys. Further, in some embodiments, the method 700 may include a step 704 of identifying, using the processing device, each of the one or more first keyboard keys based on the one or more playing indications. Further, in some embodiments, the method 700 may include a step 706 of retrieving, using the storage device 1106, a first musical sound information for each of the one or more keyboard keys based on the identifying of each of the one or more first keyboard keys. Further, in some embodiments, the method 700 may include a step 708 of synthesizing, using the processing device, a musical sound for the each of the one or more first keyboard keys based on the first musical sound information. Further, the synthesizing may include generating the musical sound. Further, in some embodiments, the method 700 may include a step 710 of transmitting, using the communication device 1102, the musical sound. Further, in an embodiment, the musical sound may be transmitted to the one or more devices. Further, the one or more devices may include one or more output devices. Further, the one or more output devices of the one or more devices may be configured for producing the musical sound. Further, in an embodiment, the musical sound may be transmitted to the musical instrument. Further, the musical instrument may include one or more output devices. Further, the one or more output devices of the musical instrument may be configured for producing the musical sound.

FIG. 8 illustrates a flowchart of a method 800 for facilitating customizing a production of musical sounds associated with a musical instrument including displaying, using the processing device, a first keyboard key indication for the first keyboard key region in the keyboard element, and a first region indication for the first region in each of the at least one characteristic associating element, in accordance with some embodiments.

Further, in some embodiments, the method 800 may include a step 802 of identifying, using the processing device, a first keyboard key region from the two or more keyboard key regions associated with each of the one or more first keyboard keys based on the one or more playing indications. Further, in some embodiments, the method 800 may include a step 804 of identifying, using the processing device, a first region from the two or more regions for each of the one or more first keyboard keys based on the first keyboard key region and the region-keyboard key relationship. Further, in some embodiments, the method 800 may include a step 806 of displaying, using the processing device, a first keyboard key indication for the first keyboard key region in the keyboard element, and a first region indication for the first region in each of the one or more characteristic associating elements based on the identifying of the first keyboard key region and the identifying of the first region. Further, the first keyboard key indication highlights the first keyboard key region and the first region indication highlights the first region. Further, the first keyboard key indication may include an indication of a musical swar associated with the keyboard key region.

FIG. 9 illustrates a flowchart of a method 900 for facilitating customizing a production of musical sounds associated with a musical instrument including displaying, using the processing device, at least one additional keyboard key indication for the at least one additional keyboard key region in the keyboard element, in accordance with some embodiments.

Further, in some embodiments, the keyboard element may include an additional plurality of keyboard key regions. Further, the additional plurality of keyboard key regions may be associated with the two or more keyboard keys. Further, the method 900 may include a step 902 of identifying, using the processing device, one or more additional keyboard key regions from the additional plurality of keyboard key regions for each of the one or more first keyboard keys based on the first keyboard key region, the region-keyboard key relationship, and a plurality of zone selections for the plurality of regions. Further, each of the one or more additional keyboard key regions represents a musical shruti (musical microtones) associated with a musical swar associated with each of the one or more first keyboard keys. Further, one or more of the two or more musical sound characteristics (such as two or more musical sound characteristics 1302 as shown in FIG. 13) may be uniquely associated with the one or more additional keyboard key regions based on an additional keyboard key-characteristic relationship. Further, the two or more musical sound characteristics may include a plurality of pitches, a plurality of tones, a plurality of notes, a plurality of microtones, etc. Further, the method 900 may include a step 904 of retrieving, using the storage device 1106, an additional musical sound information for each of the one or more additional keyboard key regions based on the identifying of the one or more additional keyboard key regions. Further, the synthesizing of the musical sound for the each of the one or more first keyboard keys may be based on the additional musical sound information of each of the one or more additional keyboard keys for each of the one or more first keyboard keys. Further, the method 900 may include a step 906 of displaying, using the processing device, one or more additional keyboard key indications for the one or more additional keyboard key regions in the keyboard element. Further, the one or more additional keyboard key indications highlight the one or more additional keyboard key regions associated with each of the one or more first keyboard keys. Further, the one or more additional keyboard key regions may be highlighted based on the highlighting of each of one or more first keyboard key regions uniquely associated with each of the one or more first keyboard keys.

FIG. 10 illustrates a flowchart of a method 1000 for facilitating customizing a production of musical sounds associated with a musical instrument including displaying, using the processing device, the at least one visual representation in the visualizer element, in accordance with some embodiments.

Further, in some embodiments, the one or more playing indications may be associated with a playing of one or more airflow devices of the musical instrument. Further, the two or more graphical interface elements may include a visualizer element (such as a visualizer element 1502, as shown in FIG. 15). Further, the method 1000 may include a step 1002 of visualizing, using the processing device, one or more musical sounds associated with one or more of the playing of the one or more first keyboard keys, and the playing of the one or more airflow devices. Further, the method 1000 may include a step 1004 of generating, using the processing device, one or more visual representations (such as one or more visual representations 1504, as shown in FIG. 15) of the one or more musical sounds based on the visualizing. Further, the one or more visual representations may include a representation of sound waves associated with the musical sound. Further, the sound wave may be a standing sound wave. Further, the one or more visual representations of waveforms of the musical sound. Further, the method 1000 may include a step 1006 of displaying, using the processing device, the one or more visual representations in the visualizer element. Further, the visualizer element may include an oscilloscope element.

Further, in some embodiment, an indication associated with the at least one keyboard key region may be associated with at least one visual characteristic. Further, the at least one visual characteristic of the indication may changed based on an air pressure of an air flow created by at least one air flow device of the musical instrument. Further, the method may include analyzing, using the processing device, an airflow information. Further, the method may include determining, using the processing device, at least one value of at least one parameter defining the at least one visual characteristic of the indication based on the air flow information. Further, the at least one parameter may include a light intensity, a color, a variation in light intensity, etc.

FIG. 11 illustrates a block diagram of a system 1100 for facilitating customizing a production of musical sounds associated with a musical instrument, in accordance with some embodiments.

Accordingly, the system 1100 may include a communication device 1102. Further, the communication device 1102 may be configured for transmitting a graphical interface to one or more devices 1202 (as shown in FIG. 12). Further, the graphical interface includes two or more graphical interface elements. Further, the two or more graphical interface elements may include a keyboard element and one or more characteristic associating elements. Further, the keyboard element includes two or more keyboard key regions corresponding to two or more keyboard keys associated with a keyboard of the musical instrument. Further, each of the one or more characteristic associating elements includes two or more regions. Further, the two or more regions may be divided into two or more zones. Further, the two or more zones may include the rows shown in FIG. 13. Further, the two or more regions may include the column shown in FIG. 13. Further, each of the two or more regions may be uniquely associated with one or more of the two or more keyboard keys based on a region-keyboard key relationship. Further, each of the two or more zones may be uniquely associated with each of two or more musical sound characteristics based on a zone-characteristic relationship. Further, the communication device 1102 may be configured for receiving a keyboard key selection of a keyboard key region from the two or more keyboard key regions using the graphical interface from the one or more devices 1202. Further, the keyboard key region corresponds to a keyboard key of the two or more keyboard keys. Further, the communication device 1102 may be configured for receiving a zone selection of a zone from the two or more zones of the region using the graphical interface from the one or more devices 1202. Further, the system 1100 may include a processing device 1104 communicatively coupled with the communication device 1102. Further, the processing device 1104 may be configured for identifying a region from the two or more regions comprised in each of the one or more characteristic associating elements based on the keyboard key selection and the region-keyboard key relationship. Further, the region corresponds to the keyboard key. Further, the processing device 1104 may be configured for displaying a region selection indication for the region in each of the one or more characteristic associating elements based on the identifying of the region. Further, the processing device 1104 may be configured for assigning a musical sound characteristic of the two or more musical sound characteristics to the keyboard key based on the zone selection and the zone-characteristic relationship. Further, the processing device 1104 may be configured for generating a musical sound information for the keyboard key based on the assigning. Further, the production of the musical sounds of the musical instrument may be based on the musical sound information. Further, the system 1100 may include a storage device 1106 communicatively coupled with the processing device 1104. Further, the storage device 1106 may be configured for storing the region-keyboard key relationship, the zone-characteristic relationship, and the musical sound information. Further, the communication device 1102 may be communicatively coupled with the one or more devices 1202 and the musical instrument 1204.

In some embodiments, the one or more characteristic associating elements include a first characteristic associating element (such as a first characteristic associating element 1402, as shown in FIG. 14) and a second characteristic associating element (such as a second characteristic associating element 1404, as shown in FIG. 14). Further, the first characteristic associating element may include the pitch-vs-key grid, and the second characteristic associating element may include the swar-swar interdependence grid. Further, the two or more regions include a first two or more regions and a second two or more regions. Further, the first two or more regions may be associated with the two or more keyboard key identifiers, and the second two or more regions may be associated with the two or more musical swars. Further, the two or more zones include a first two or more zones and a second two or more zones. Further, the first two or more zones may be associated with the two or more musical pitches. Further, the second two or more zones may be associated with the two or more musical swars. Further, the first two or more regions may be divided into the first two or more zones and the second two or more regions may be divided into the second two or more zones. Further, the two or more musical sound characteristics may include a first two or more musical sound characteristics and a second two or more musical sound characteristics. Further, the first two or more musical sound characteristics may include the two or more musical pitches, and the second two or more musical sound characteristics may include the two or more musical swars. Further, the region-keyboard key relationship includes a first region-keyboard key relationship and a second region-keyboard key relationship. Further, each of the first two or more regions may be uniquely associated with one or more of the two or more keyboard keys based on the first region-keyboard key relationship, and each of the second two or more regions may be uniquely associated with one or more of the two or more keyboard keys based on the second region-keyboard key relationship. Further, the zone-characteristic relationship includes a first zone-characteristic relationship and a second zone-characteristic relationship. Further, each of the first two or more zones may be uniquely associated with each of the first plurality of musical sound characteristics based on the first zone-characteristic relationship, and each of the second two or more zones may be uniquely associated with each of the second two or more musical sound characteristics based on the second zone-characteristic relationship. Further, the identifying of the region from the two or more regions includes identifying a first region from the first two or more regions based on the keyboard key selection and the first region-keyboard key relationship, and a second region from the second two or more regions based on the keyboard key selection and the second region-keyboard key relationship. Further, the first region and the second region correspond to the keyboard key. Further, the displaying of the region selection indication for the region in each of the one or more characteristic associating elements includes displaying a first region selection indication for the first region in the first characteristic associating element, and a second region selection indication for the second region in the second characteristic associating element. Further, the receiving of the zone selection of the zone from the two or more zones of the region using the graphical interface includes receiving a first zone selection of the first zone from the first two or more zones of the first region, and a second zone selection of the second zone from the second two or more zones using the graphical interface from the one or more devices. Further, the first zone and the second zone correspond to the keyboard key. Further, the assigning of the musical sound characteristic of the two or more musical sound characteristics uniquely to one or more of the two or more keyboard keys includes assigning a first musical sound characteristic of the first two or more musical sound characteristics uniquely to one or more of the two or more keyboard keys based on the first zone selection and the first zone-characteristic relationship, and a second musical sound characteristic of the second two or more musical sound characteristics uniquely to one or more of the two or more keyboard keys based on the second zone selection and the second zone-characteristic relationship. Further, the generating of the musical sound information for the keyboard key may be based on the assigning of the first musical sound characteristic of the first two or more musical sound characteristics to the keyboard key based on the first zone selection and the first zone-characteristic relationship, and the second musical sound characteristic of the second two or more musical sound characteristics to the keyboard key based on the second zone selection and the second zone-characteristic relationship.

In some embodiments, each of the first two or more regions may be uniquely associated with each of two or more keyboard key identifiers (such as two or more keyboard key identifiers 1312). Further, each of the two or more keyboard key identifiers may be uniquely associated with one or more of the two or more keyboard keys based on an identifier-keyboard key relationship. Further, the first two or more musical sound characteristics may include two or more musical pitches. Further, each of the two or more musical pitches may be uniquely associated each of the first two or more zones, Further, the identifier-keyboard key relationship may include an association dependency between each of the two or more keyboard key identifiers and one or more keyboard keys of the two or more keyboard keys. Further, each of the second two or more regions may be uniquely associated with two or more musical notes. Further, the two or more musical notes may include musical swars. Further, each of the two or more musical notes may be uniquely associated with one or more of the two or more keyboard keys based on a note-keyboard key relationship. Further, the note-keyboard key relationship may include an association dependency between each of the two or more musical notes and one or more keyboard keys of the two or more keyboard keys. Further, the second two or more musical sound characteristics may include two or more first musical notes. Further, each of the two or more first musical notes may be uniquely associated each of the second two or more zones. Further, the generating of the musical sound information for the keyboard key may be based on the identifier-keyboard key relationship and the note-keyboard key relationship.

Further, in some embodiments, the two or more graphical interface elements may include a selection element. Further, the selection element may include a reed selection element. Further, the reed selection element may include two or more reed type regions corresponding to two or more reed banks of the musical instrument. Further, the two or more reed banks may include a kharaj reed bank, a Nar reed bank, etc. Further, each of the two or more reed banks corresponds to a specific sounding set of reeds. Further, the specific sounding set of reeds may be male, female, bass, tenor, etc. Further, each of the two or more reed banks corresponds to a reed bank type. Further, the reed bank type may include a nar type, a Kharaj type, etc. Further, each of the two or more sound generating elements may be associated with the two or more keyboard keys. Further, the communication device 1102 may be configured for receiving a selection of one or more of the two or more selection regions using the one or more user interfaces from the one or more devices 1202. Further, the processing device 1104 may be configured for identifying one or more of the two or more sound generating elements based on the selection. Further, the generating of the musical sound information for the keyboard key may be based on the identifying of one or more of the two or more sound generating elements. Further, the processing device 1104 may be configured for displaying a selection indication for one or more of the two or more selection regions based on the selection.

Further, in some embodiments, the communication device 1102 may be configured for receiving one or more region-keyboard key associating indications for uniquely associating one or more of the two or more regions with one or more of the two or more keyboard keys using the graphical interface from the one or more devices 1202. Further, the processing device 1104 may be configured for modifying a previous region-keyboard key relationship between each of the two or more regions and one or more of the two or more keyboard keys based on the one or more region-keyboard key associating indications. Further, the processing device 1104 may be configured for generating the region-keyboard key relationship between each of the two or more regions and one or more of the two or more keyboard keys based on the modifying of the previous region-keyboard key relationship.

Further, in some embodiments, the communication device 1102 may be configured for receiving one or more zone-characteristic associating indications for uniquely associating one or more of the two or more zones with one or more of the two or more musical sound characteristics using the graphical interface from the one or more devices 1202. Further, the processing device 1104 may be configured for modifying a previous zone-characteristic relationship between each of the two or more zones and each of the two or more musical sound characteristics based on the one or more zone-characteristic associating indications. Further, the processing device 1104 may be configured for generating the zone-characteristic relationship between each of the two or more zones and each of the two or more musical sound characteristics based on the modifying of the previous zone-characteristic relationship.

Further, in some embodiments, the communication device 1102 may be configured for receiving one or more playing indications associated with a playing of the musical instrument. Further, the one or more playing indications may include a playing of one or more first keyboard keys of the two or more keyboard keys. Further, the communication device 1102 may be configured for transmitting a musical sound. Further, the processing device 1104 may be configured for identifying each of the one or more first keyboard keys based on the one or more playing indications. Further, the processing device 1104 may be configured for synthesizing the musical sound for the each of the one or more first keyboard keys based on a first musical sound information. Further, the storage device 1106 may be configured for retrieving the first musical sound information for each of the one or more keyboard keys based on the identifying of each of the one or more first keyboard keys.

Further, in some embodiments, the processing device 1104 may be configured for identifying a first keyboard key region from the two or more keyboard key regions associated with each of the one or more first keyboard keys based on the one or more playing indications. Further, the processing device 1104 may be configured for identifying a first region from the two or more regions for each of the one or more first keyboard keys based on the first keyboard key region and the region-keyboard key relationship. Further, the processing device 1104 may be configured for displaying a first keyboard key indication for the first keyboard key region in the keyboard element, and a first region indication for the first region in each of the one or more characteristic associating elements based on the identifying of the first keyboard key region and the identifying of the first region.

Further, in some embodiments, the keyboard element may include an additional plurality of keyboard key regions. Further, the additional plurality of keyboard key regions may be associated with the two or more keyboard keys. Further, the processing device 1104 may be configured for identifying one or more additional keyboard key regions from the additional plurality of keyboard key regions for each of the one or more first keyboard keys based on the first keyboard key region, the region-keyboard key relationship, and a plurality of zone selections for the plurality of regions. Further, one or more of the two or more musical sound characteristics may be uniquely associated with the one or more additional keyboard key regions based on an additional keyboard key-characteristic relationship. Further, the processing device 1104 may be configured for displaying one or more additional keyboard key indications for the one or more additional keyboard key regions in the keyboard element. Further, the storage device 1106 may be configured for retrieving an additional musical sound information for each of the one or more additional keyboard key regions based on the identifying of the one or more additional keyboard key regions. Further, the synthesizing of the musical sound for the each of the one or more first keyboard keys may be based on the additional musical sound information of each of the one or more additional keyboard keys for each of the one or more first keyboard keys.

Further, in some embodiments, the one or more playing indications may be associated with a playing of one or more airflow devices of the musical instrument. Further, the two or more graphical interface elements may include a visualizer element. Further, the processing device 1104 may be configured for visualizing one or more musical sounds associated with one or more of the playing of the one or more first keyboard keys, and the playing of the one or more airflow devices. Further, the processing device 1104 may be configured for generating one or more visual representations of the one or more musical sounds based on the visualizing. Further, the processing device 1104 may be configured for displaying the one or more visual representations in the visualizer element.

FIG. 12 illustrates a block diagram of the system 1100 for facilitating customizing a production of musical sounds associated with a musical instrument, in accordance with some embodiments.

FIG. 13 illustrates a screenshot of a user interface 1300 of a software platform associated with the disclosed system for facilitating customizing a production of musical sounds associated with a musical instrument, in accordance with some embodiments. Accordingly, the user interface 1300 illustrates the interdependence of all tones (musical notes or musical swars) with all other tones. Further, the user interface 1300 may display a plurality of musical sound characteristics 1302 that may include a plurality of pitches, a plurality of tones, a plurality of notes, a plurality of microtones, etc. Further, the disclosed system may allow the user to set relations between two different tones with one touch. Further, the user interface 1300 may display two reeds—Kharj octave 1304 and Nar octave 1306 indicating which reed will be played. Further, the disclosed system allows both of the two reeds to be played simultaneously. Further, the user interface 1300 may display two keyboards 1308-1310 (two types of keys), wherein a top keyboard 1308 shows which keyboard key is pressed and what is being played on an instrument such as a harmonium. Further, a bottom keyboard 1310 shows whatever microtones (shruti) are there for the keyboard keys or the tones that are being played on the instrument (such as a keyboard). Further, the disclosed system may be used with any instrument where microtonal frequencies/sounds/shrutis are important. Further, the user interface 1300 may display two or more keyboard key identifiers 1312. Further, the user interface 1300 may display one or more characteristic associating elements 1314.

FIG. 14 illustrates a screenshot of a user interface 1400 of the software platform associated with the disclosed system for facilitating customizing a production of musical sounds associated with a musical instrument, in accordance with some embodiments. Further, the user interface 1400 may display a first characteristic associating element 1402 and a second characteristic associating element 1404.

FIG. 15 illustrates a screenshot of a user interface 1500 of the software platform associated with the disclosed system for facilitating customizing a production of musical sounds associated with a musical instrument, in accordance with some embodiments. FIG. 15 illustrates an oscilloscope that may have a wave form that may operate when an instrument is played. FIG. 15 shows a standing wave created by the reeds that are been played. Further, the user interface 1500 may display a visualizer element 1502 or the standing wave and one or more visual representations 1504.

According to some embodiment, a device for facilitating customizing a production of musical sounds associated with a musical instrument is disclosed. Further, the device may be a system. Further, the device may include a user interface device, a processing device, and a storage device. Further, the user interface device may include a touch screen. Further, the device may be configured to be communicatively coupled with the musical instrument. Further, the user interface device may be configured for displaying a graphical interface. Further, the graphical interface includes two or more graphical interface elements. Further, the user interface device may be configured for receiving a key selection of a key region from the two or more key regions using the graphical interface from the musical instrument. Further, the user interface device may be configured for receiving a zone selection of a zone from the two or more zones of the region using the graphical interface. Further, the processing device may be communicatively coupled with the user interface device. Further, the processing device may be configured for identifying a region from the two or more regions comprised in each of the one or more characteristic associating elements based on the key selection and the region-key relationship. Further, the processing device may be configured for displaying a region selection indication for the region in each of the one or more characteristic associating elements based on the identifying of the region. Further, the processing device may be configured for assigning each of the two or more musical sound characteristics uniquely to one or more of the two or more keys based on the zone selection and the zone-characteristic relationship. Further, the processing device may be configured for generating a musical sound information for one or more of the two or more keys based on the assigning. Further, the storage device may communicatively coupled with the processing device. Further, the storage device may be configured for storing the region-key relationship, the zone-characteristic relationship, and the musical sound information.

Although the invention has been explained in relation to its preferred embodiment, it is to be understood that many other possible modifications and variations can be made without departing from the spirit and scope of the invention as hereinafter claimed.

What is claimed is:

1. A method for facilitating customizing a production of musical sounds associated with a musical instrument, the method comprising:

transmitting, using a communication device, a graphical interface to at least one device, wherein the graphical interface comprises a plurality of graphical interface elements, wherein the plurality of graphical interface elements comprises a keyboard element and at least one characteristic associating element, wherein the keyboard element comprises a plurality of keyboard key regions corresponding to a plurality of keyboard keys associated with a keyboard of the musical instrument, wherein each of the at least one characteristic associating element comprises a plurality of regions, wherein the plurality of regions is divided into a plurality of zones, wherein each of the plurality of regions is uniquely associated with at least one of the plurality of keyboard keys based on a region-keyboard key relationship, wherein each of the plurality of zones is uniquely associated with each of a plurality of musical sound characteristics based on a zone-characteristic relationship;

receiving, using the communication device, a keyboard key selection of a keyboard key region from the plurality of keyboard key regions using the graphical interface from the at least one device, wherein the keyboard key region corresponds to a keyboard key of the plurality of keyboard keys;

identifying, using a processing device, a region from the plurality of regions comprised in each of the at least one characteristic associating element based on the keyboard key selection and the region-keyboard key relationship, wherein the region corresponds to the keyboard key;

displaying, using the processing device, a region selection indication for the region in each of the at least one characteristic associating element based on the identifying of the region;

receiving, using the communication device, a zone selection of a zone from the plurality of zones of the region using the graphical interface from the at least one device;

assigning, using the processing device, a musical sound characteristic of the plurality of musical sound characteristics to the keyboard key based on the zone selection and the zone-characteristic relationship;

generating, using the processing device, a musical sound information for the keyboard key based on the assigning, wherein the production of the musical sounds of the musical instrument is based on the musical sound information; and storing, using a storage device, the region-keyboard key relationship, the zone-characteristic relationship, and the musical sound information.

2. The method of claim 1, wherein the at least one characteristic associating element comprises a first characteristic associating element and a second characteristic associating element, wherein the plurality of regions comprises a first plurality of regions and a second plurality of regions, wherein the plurality of zones comprises a first plurality of zones and a second plurality of zones, wherein the first plurality of regions is divided into the first plurality of zones and the second plurality of regions is divided into the second plurality of zones, wherein the plurality of musical sound characteristics comprises a first plurality of musical sound characteristics and a second plurality of musical sound characteristics, wherein the region-keyboard key relationship comprises a first region-keyboard key relationship and a second region-keyboard key relationship, wherein each of the first plurality of regions is uniquely associated with at least one of the plurality of keyboard keys based on the first region-keyboard key relationship, and each of the second plurality of regions is uniquely associated with at least one of the plurality of keyboard keys based on the second region-keyboard key relationship, wherein the zone-characteristic relationship comprises a first zone-characteristic relationship and a second zone-characteristic relationship, wherein each of the first plurality of zones is uniquely associated with each of the first plurality of musical sound characteristic based on the first zone-characteristic relationship, and each of the second plurality of zones is uniquely associated with each of the second plurality of musical sound characteristics based on the second zone-characteristic relationship, wherein the identifying of the region from the plurality of regions comprises identifying a first region from the first plurality of regions based on the keyboard key selection and the first region-keyboard key relationship, and a second region from the second plurality of regions based on the keyboard key selection and the second region-keyboard key relationship, wherein the first region and the second region corresponds to the keyboard key, wherein the displaying of the region selection indication for the region in each of the at least one characteristic associating element comprises displaying a first region selection indication for the first region in the first characteristic associating element, and a second region selection indication for the second region in the second characteristic associating element, wherein the receiving of the zone selection of the zone from the plurality of zones of the region using the graphical interface comprises receiving a first zone selection of the first zone from the first plurality of zones of the first region, and a second zone selection of the second zone from the second plurality of zones using the graphical interface from the at least one device, wherein the first zone and the second zone corresponds to the keyboard key, wherein the assigning of the musical sound characteristic of the plurality of musical sound characteristics uniquely to at least one of the plurality of keyboard keys comprises assigning a first musical sound characteristic of the first plurality of musical sound characteristics uniquely to at least one of the plurality of keyboard keys based on the first zone selection and the first zone-characteristic relationship, and a second musical sound characteristic of the second plurality of musical sound characteristics uniquely to at least one of the plurality of keyboard keys based on the second zone selection and the second zone-characteristic relationship, wherein the generating of the musical sound information for the keyboard key is further based on the assigning of the first musical sound characteristics of the first plurality of musical sound characteristics to the keyboard key based on the first zone selection and the first zone-characteristic relationship, and the second musical sound characteristic of the second plurality of musical sound characteristics to the keyboard key based on the second zone selection and the second zone-characteristic relationship.

3. The method of claim 2, wherein each of the first plurality of regions is uniquely associated with each of a plurality of keyboard key identifiers, wherein each of the plurality of keyboard key identifiers is uniquely associated at least one of the plurality of keyboard keys based on an identifier-keyboard key relationship, wherein the first plurality of musical sound characteristics comprises a plurality of musical pitches, wherein each of the plurality of musical pitches is uniquely associated each of the first plurality of zones, wherein each of the second plurality of regions is uniquely associated with a plurality of musical notes, wherein each of the plurality of musical notes is uniquely associated with at least one of the plurality of keyboard keys based on a note-keyboard key relationship, wherein the second plurality of musical sound characteristics comprises a plurality of first musical notes, wherein each of the plurality of first musical notes is uniquely associated each of the second plurality of zones, wherein the generating of the musical sound information for the keyboard key is further based on the identifier-keyboard key relationship and the note-keyboard key relationship.

4. The method of claim 1, wherein the plurality of graphical interface elements comprises a selection element, wherein the selection element comprises a plurality of selection regions corresponding to a plurality of sound generating elements of the musical instrument, wherein each of the plurality of sound generating elements is associated with the plurality of keyboard keys, wherein the method further comprises:

receiving, using the communication device, a selection of at least one of the plurality of selection regions using the at least one user interface from the at least one device;

identifying, using the processing device, at least one of the plurality of sound generating elements based on the selection, wherein the generating of the musical sound information for the keyboard key is further based on the identifying of at least one of the plurality of sound generating elements; and displaying, using the processing device, a selection indication for at least one of the plurality of selection regions based on the selection.

5. The method of claim 1 further comprising:

receiving, using the communication device, at least one region-keyboard key associating indication for uniquely associating at least one of the plurality of regions with at least one of the plurality of keyboard keys using the graphical interface from the at least one device;

modifying, using the processing device, a previous region-keyboard key relationship between each of the plurality of regions and at least one of the plurality of keyboard keys based on the at least one region-keyboard key associating indication; and generating, using the processing device, the region-keyboard key relationship between each of the plurality of regions and at least one of the plurality of keyboard keys based on the modifying of the previous region-keyboard key relationship.

6. The method of claim 1 further comprising:

receiving, using the communication device, at least one zone-characteristic associating indication for uniquely associating at least one of the plurality of zones with at least one of the plurality of musical sound characteristics using the graphical interface from the at least one device;

modifying, using the processing device, a previous zone-characteristic relationship between each of the plurality of zones and each of the plurality of musical sound characteristics based on the at least one zone-characteristic associating indication; and generating, using the processing device, the zone-characteristic relationship between each of the plurality of zones and each of the plurality of musical sound characteristics based on the modifying of the previous zone-characteristic relationship.

7. The method of claim 1 further comprising:

receiving, using the communication device, at least one playing indication associated with a playing of the musical instrument, wherein the at least one playing indication comprises a playing of at least one first keyboard key of the plurality of keyboard keys;

identifying, using the processing device, each of the at least one first keyboard key based on the at least one playing indication;

retrieving, using the storage device, a first musical sound information for each of the at least one keyboard key based on the identifying of each of the at least one first keyboard key;

synthesizing, using the processing device, a musical sound for the each of the at least one first keyboard key based on the first musical sound information; and transmitting, using the communication device, the musical sound.

8. The method of claim 7 further comprising:

identifying, using the processing device, a first keyboard key region from the plurality of keyboard key regions associated with each of the at least one first keyboard key based on the at least one playing indication;

identifying, using the processing device, a first region from the plurality of regions for each of the at least one first keyboard key based on the first keyboard key region and the region-keyboard key relationship; and displaying, using the processing device, a first keyboard key indication for the first keyboard key region in the keyboard element, and a first region indication for the first region in each of the at least one characteristic associating element based on the identifying of the first keyboard key region and the identifying of the first region.

9. The method of claim 8, wherein the keyboard element further comprises an additional plurality of keyboard key regions, wherein the additional plurality of keyboard key regions is associated with the plurality of keyboard keys, wherein the method further comprises:

identifying, using the processing device, at least one additional keyboard key region from the additional plurality of keyboard key regions for each of the at least one first keyboard key based on the first keyboard key region, the region-keyboard key relationship, and a plurality of zone selections for the plurality of regions, wherein at least one of the plurality of musical sound characteristics is uniquely associated with the at least one additional keyboard key region based on an additional keyboard key-characteristic relationship;

retrieving, using the storage device, an additional musical sound information for each of the at least one additional keyboard key region based on the identifying of the at least one additional keyboard key region, wherein the synthesizing of the musical sound for the each of the at least one first keyboard key is further based on the additional musical sound information of each of the at least one additional keyboard key for each of the at least one first keyboard key; and displaying, using the processing device, at least one additional keyboard key indication for the at least one additional keyboard key region in the keyboard element.

10. The method of claim 7, wherein the at least one playing indication is associated with a playing of at least one airflow device of the musical instrument, wherein the plurality of graphical interface elements comprises a visualizer element, wherein the method further comprises:

visualizing, using the processing device, at least one musical sound associated with at least one of the playing of the at least one first keyboard key, and the playing of the at least one airflow device;

generating, using the processing device, at least one visual representation of the at least one musical sound based on the visualizing; and displaying, using the processing device, the at least one visual representation in the visualizer element.

11. A system for facilitating customizing a production of musical sounds associated with a musical instrument, the system comprising:

a communication device configured for:

transmitting a graphical interface to at least one device, wherein the graphical interface comprises a plurality of graphical interface elements, wherein the plurality of graphical interface elements comprises a keyboard element and at least one characteristic associating element, wherein the keyboard element comprises a plurality of keyboard key regions corresponding to a plurality of keyboard keys associated with a keyboard of the musical instrument, wherein each of the at least one characteristic associating element comprises a plurality of regions, wherein the plurality of regions is divided into a plurality of zones, wherein each of the plurality of regions is uniquely associated with at least one of the plurality of keyboard keys based on a region-keyboard key relationship, wherein each of the plurality of zones is uniquely associated with each of a plurality of musical sound characteristics based on a zone-characteristic relationship;

receiving a keyboard key selection of a keyboard key region from the plurality of keyboard key regions using the graphical interface from the at least one device, wherein the keyboard key region corresponds to a keyboard key of the plurality of keyboard keys; and receiving a zone selection of a zone from the plurality of zones of the region using the graphical interface from the at least one device;

a processing device communicatively coupled with the communication device, wherein the processing device is configured for:

identifying a region from the plurality of regions comprised in each of the at least one characteristic associating element based on the keyboard key selection and the region-keyboard key relationship, wherein the region corresponds to the keyboard key;

displaying a region selection indication for the region in each of the at least one characteristic associating element based on the identifying of the region;

assigning a musical sound characteristic of the plurality of musical sound characteristics to the keyboard key of the plurality of keyboard keys based on the zone selection and the zone-characteristic relationship; and generating a musical sound information for the keyboard key based on the assigning, wherein the production of the musical sounds of the musical instrument is based on the musical sound information; and a storage device communicatively coupled with the processing device, wherein the storage device is configured for storing the region-keyboard key relationship, the zone-characteristic relationship, and the musical sound information.

12. The system of claim 11, wherein the at least one characteristic associating element comprises a first characteristic associating element and a second characteristic associating element, wherein the plurality of regions comprises a first plurality of regions and a second plurality of regions, wherein the plurality of zones comprises a first plurality of zones and a second plurality of zones, wherein the first plurality of regions is divided into the first plurality of zones and the second plurality of regions is divided into the second plurality of zones, wherein the plurality of musical sound characteristics comprises a first plurality of musical sound characteristics and a second plurality of musical sound characteristics, wherein the region-keyboard key relationship comprises a first region-keyboard key relationship and a second region-keyboard key relationship, wherein each of the first plurality of regions is uniquely associated with at least one of the plurality of keyboard keys based on the first region-keyboard key relationship, and each of the second plurality of regions is uniquely associated with at least one of the plurality of keyboard keys based on the second region-keyboard key relationship, wherein the zone-characteristic relationship comprises a first zone-characteristic relationship and a second zone-characteristic relationship, wherein each of the first plurality of zones is uniquely associated with each of the first plurality of musical sound characteristic based on the first zone-characteristic relationship, and each of the second plurality of zones is uniquely associated with each of the second plurality of musical sound characteristics based on the second zone-characteristic relationship, wherein the identifying of the region from the plurality of regions comprises identifying a first region from the first plurality of regions based on the keyboard key selection and the first region-keyboard key relationship, and a second region from the second plurality of regions based on the keyboard key selection and the second region-keyboard key relationship, wherein the first region and the second region corresponds to the keyboard key, wherein the displaying of the region selection indication for the region in each of the at least one characteristic associating element comprises displaying a first region selection indication for the first region in the first characteristic associating element, and a second region selection indication for the second region in the second characteristic associating element, wherein the receiving of the zone selection of the zone from the plurality of zones of the region using the graphical interface comprises receiving a first zone selection of the first zone from the first plurality of zones of the first region, and a second zone selection of the second zone from the second plurality of zones using the graphical interface from the at least one device, wherein the first zone and the second zone corresponds to the keyboard key, wherein the assigning of the musical sound characteristic of the plurality of musical sound characteristics uniquely to at least one of the plurality of keyboard keys comprises assigning a first musical sound characteristic of the first plurality of musical sound characteristics uniquely to at least one of the plurality of keyboard keys based on the first zone selection and the first zone-characteristic relationship, and a second musical sound characteristic of the second plurality of musical sound characteristics uniquely to at least one of the plurality of keyboard keys based on the second zone selection and the second zone-characteristic relationship, wherein the generating of the musical sound information for at least one of the plurality of keyboard keys is further based on the assigning of the first musical sound characteristics of the first plurality of musical sound characteristics uniquely to at least one of the plurality of keyboard keys based on the first zone selection and the first zone-characteristic relationship, and the second musical sound characteristic of the second plurality of musical sound characteristics uniquely to at least one of the plurality of keyboard keys based on the second zone selection and the second zone-characteristic relationship.

13. The system of claim 12, wherein each of the first plurality of regions is uniquely associated with each of a plurality of keyboard key identifiers, wherein each of the plurality of keyboard key identifiers is uniquely associated at least one of the plurality of keyboard keys based on an identifier-keyboard key relationship, wherein the first plurality of musical sound characteristics comprises a plurality of musical pitches, wherein each of the plurality of musical pitches is uniquely associated each of the first plurality of zones, wherein each of the second plurality of regions is uniquely associated with a plurality of musical notes, wherein each of the plurality of musical notes is uniquely associated with at least one of the plurality of keyboard keys based on a note-keyboard key relationship, wherein the second plurality of musical sound characteristics comprises a plurality of first musical notes, wherein each of the plurality of first musical notes is uniquely associated each of the second plurality of zones, wherein the generating of the musical sound information for the keyboard key is further based on the identifier-keyboard key relationship and the note-keyboard key relationship.

14. The system of claim 11, wherein the plurality of graphical interface elements comprises a selection element, wherein the selection element comprises a plurality of selections regions corresponding to a plurality of sound generating elements of the musical instrument, wherein each of the plurality of sound generating elements is associated with the plurality of keyboard keys, wherein the communication device is further configured for receiving a selection of at least one of the plurality of selection regions using the at least one user interface from the at least one device, wherein the processing device is further configured for:

identifying at least one of the plurality of sound generating elements based on the selection, wherein the generating of the musical sound information for the keyboard key is further based on the identifying of at least one of the plurality of sound generating elements; and displaying a selection indication for at least one of the plurality of selection regions based on the selection.

15. The system of claim 11, wherein the communication device is further configured for receiving at least one region-keyboard key associating indication for uniquely associating at least one of the plurality of regions with at least one of the plurality of keyboard keys using the graphical interface from the at least one device, wherein the processing device is further configured for:

modifying a previous region-keyboard key relationship between each of the plurality of regions and at least one of the plurality of keyboard keys based on the at least one region-keyboard key associating indication; and generating the region-keyboard key relationship between each of the plurality of regions and at least one of the plurality of keyboard keys based on the modifying of the previous region-keyboard key relationship.

16. The system of claim 11, wherein the communication device is further configured for receiving at least one zone-characteristic associating indication for uniquely associating at least one of the plurality of zones with at least one of the plurality of musical sound characteristics using the graphical interface from the at least one device, wherein the processing device is further configured for:

modifying a previous zone-characteristic relationship between each of the plurality of zones and each of the plurality of musical sound characteristics based on the at least one zone-characteristic associating indication; and generating the zone-characteristic relationship between each of the plurality of zones and each of the plurality of musical sound characteristics based on the modifying of the previous zone-characteristic relationship.

17. The system of claim 11, wherein the communication device is further configured for:

receiving at least one playing indication associated with a playing of the musical instrument, wherein the at least one playing indication comprises a playing of at least one first keyboard key of the plurality of keyboard keys; and transmitting a musical sound, wherein the processing device is further configured for:

identifying each of the at least one first keyboard key based on the at least one playing indication; and synthesizing the musical sound for the each of the at least one first keyboard key based on a first musical sound information, wherein the storage device is further configured for retrieving the first musical sound information for each of the at least one keyboard key based on the identifying of each of the at least one first keyboard key.

18. The system of claim 17, wherein the processing device is further configured for:

identifying a first keyboard key region from the plurality of keyboard key regions associated with each of the at least one first keyboard key based on the at least one playing indication;

identifying a first region from the plurality of regions for each of the at least one first keyboard key based on the first keyboard key region and the region-keyboard key relationship; and displaying a first keyboard key indication for the first keyboard key region in the keyboard element, and a first region indication for the first region in each of the at least one characteristic associating element based on the identifying of the first keyboard key region and the identifying of the first region.

19. The system of claim 18, wherein the keyboard element further comprises an additional plurality of keyboard key regions, wherein the additional plurality of keyboard key regions is associated with the plurality of keyboard keys, wherein the processing device is further configured for:

identifying at least one additional keyboard key region from the additional plurality of keyboard key regions for each of the at least one first keyboard key based on the first keyboard key region, the region-keyboard key relationship, and a plurality of zone selections for the plurality of regions, wherein at least one of the plurality of musical sound characteristics is uniquely associated with the at least one additional keyboard key region based on an additional keyboard key-characteristic relationship; and displaying at least one additional keyboard key indication for the at least one additional keyboard key region in the keyboard element, wherein the storage device is further configured for retrieving an additional musical sound information for each of the at least one additional keyboard key region based on the identifying of the at least one additional keyboard key region, wherein the synthesizing of the musical sound for the each of the at least one first keyboard key is further based on the additional musical sound information of each of the at least one additional keyboard key for each of the at least one first keyboard key.

20. The system of claim 17, wherein the at least one playing indication is associated with a playing of at least one airflow device of the musical instrument, wherein the plurality of graphical interface elements comprises a visualizer element, wherein the processing device is further configured for:

visualizing at least one musical sound associated with at least one of the playing of the at least one first keyboard key, and the playing of the at least one airflow device;

generating at least one visual representation of the at least one musical sound based on the visualizing; and displaying the at least one visual representation in the visualizer element.

* * * * *